(12) United States Patent
Fischel et al.

(10) Patent No.: US 8,394,518 B2
(45) Date of Patent: Mar. 12, 2013

(54) GALVANIC ELECTROCHEMICAL CELLS FOR GENERATING ALTERNATING CURRENT ELECTRICITY

(75) Inventors: Halbert Fischel, Santa Barbara, CA (US); Sheldon L Epstein, Wilmette, IL (US)

(73) Assignee: Global Energy Science, LLC (California), Santa Barbara, CA (US)

( * ) Notice: Subject to any disclaimer, the term of this patent is extended or adjusted under 35 U.S.C. 154(b) by 0 days.

(21) Appl. No.: 13/437,771

(22) Filed: Apr. 2, 2012

(65) Prior Publication Data

US 2012/0189875 A1 Jul. 26, 2012

Related U.S. Application Data

(60) Continuation-in-part of application No. 13/194,049, filed on Jul. 29, 2011, now Pat. No. 8,283,062, which is a division of application No. 12/800,658, filed on May 20, 2010, now Pat. No. 8,017,261.

(51) Int. Cl.
*H01M 2/38* (2006.01)
*H01M 8/04* (2006.01)

(52) U.S. Cl. ............ 429/69; 429/72; 429/451; 429/498; 429/513

(58) Field of Classification Search .............. 429/67–69, 429/72, 450–451, 453, 498, 512–513
See application file for complete search history.

(56) References Cited

U.S. PATENT DOCUMENTS 3,400,305 A 9/1968 Coffman et al.
3,663,298 A 5/1972 McCoy et al.

*Primary Examiner* — Basia Ridley
*Assistant Examiner* — Jonathan G Leong
(74) *Attorney, Agent, or Firm* — Sheldon L. Epstein; Malcolm J. Chisholm, Jr.; Pamela J. Curbelo

(57) ABSTRACT

Galvanic electrochemical cells (100, 300, 700, 900) for converting chemical energy into electrical energy, such as batteries, flow cells and fuel cells with a cylindrical rotating filter (120$_X$, 326, 726, 910) having ion-porous (120$_P$, 326$_P$, 726$_P$, 910$_P$) and ion-non-porous filter (120$_N$, 326$_N$, 726$_N$, 910$_N$) for use with both thixotropic and non-conducting electrolytes that generates fluid flows in electrolytes between static cylindrical current collector segments (106, 304$_X$, 306$_X$, 710$_X$, 902$_X$; 108, 314$_X$, 316$_X$, 712$_X$, 906) and the filter (120, 326, 726, 910) are disclosed that generate electric currents varying in amplitude that can be converted into alternating current electricity.

16 Claims, 11 Drawing Sheets

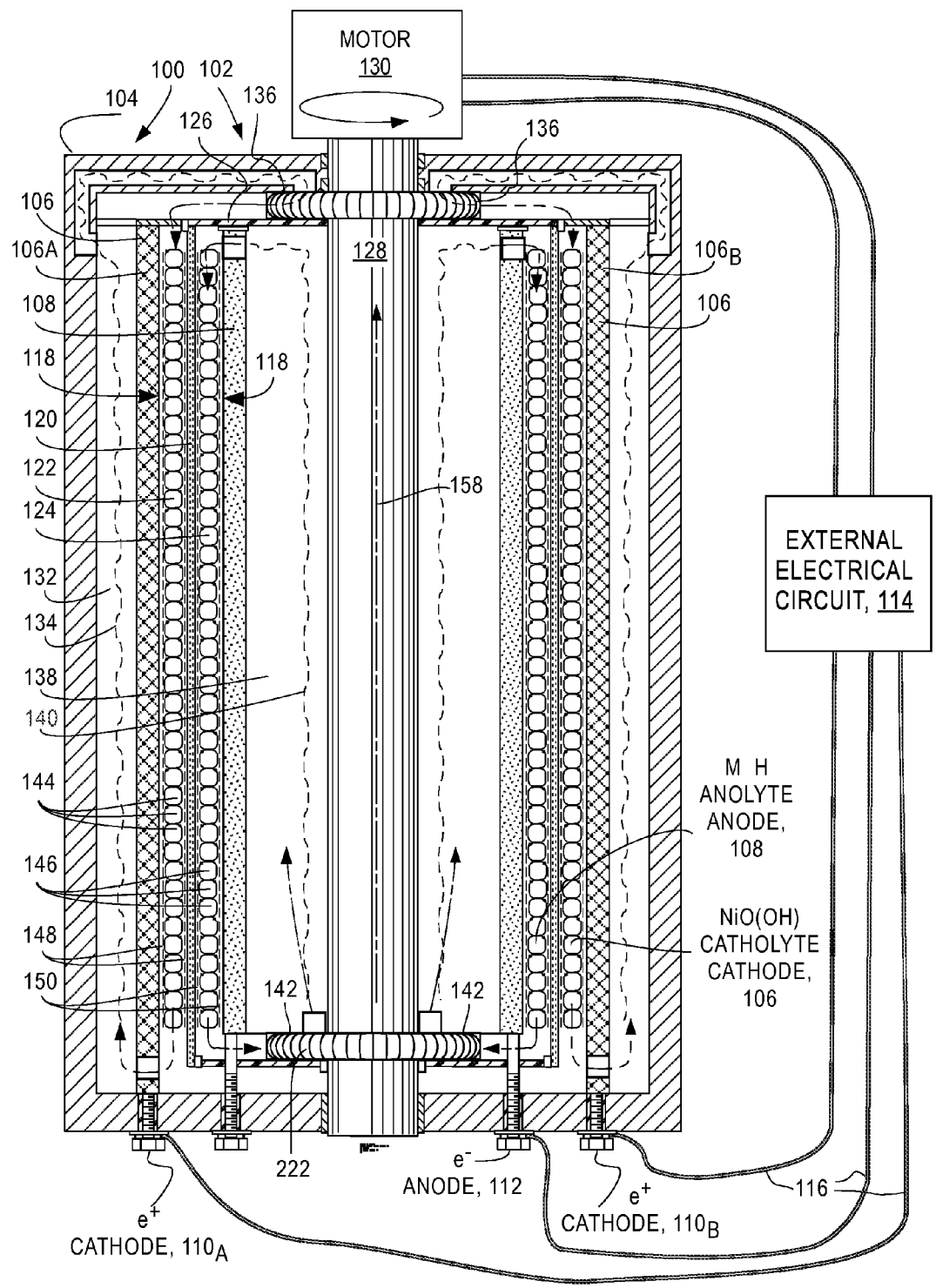

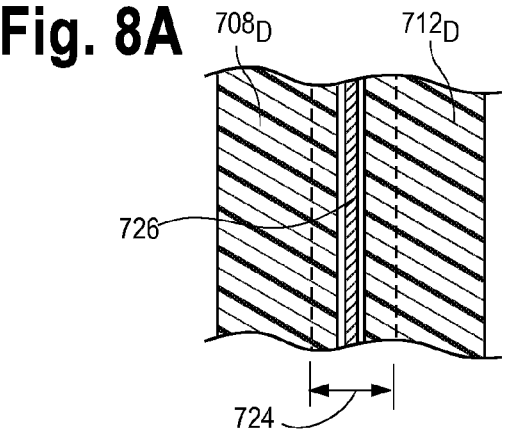
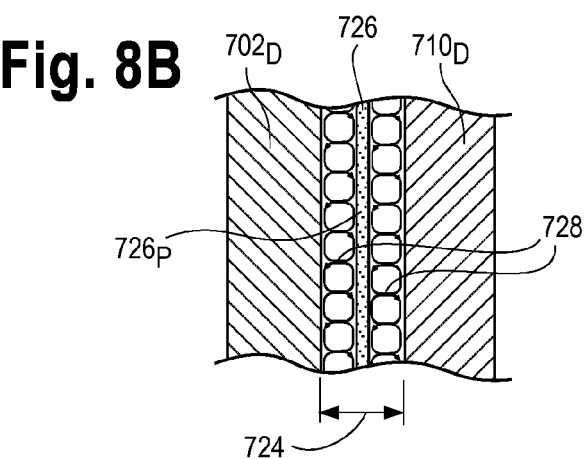
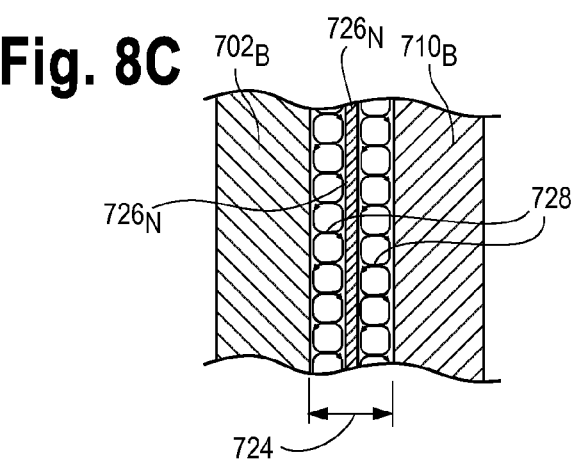

GALVANIC ELECTROCHEMICAL CELLS FOR GENERATING ALTERNATING CURRENT ELECTRICITY

CROSS-REFERENCE TO RELATED APPLICATIONS

This application is a continuation-in-part of U.S. patent application Ser. No. 13/235,480 of 18 Sep. 2011 that is a continuation-in-part of U.S. patent application Ser. No. 13/194,049 of 29 Jul. 2011 that is a division of U.S. patent application Ser. No. 12/800,658 filed 20 May 2010, now U.S. Pat. No. 8,017,261 of 13 Sep. 2011, which claims the benefit of my U.S. Provisional Application No. 61/220,583 filed 26 Jun. 2009.

This application, identified as Case H, is related to the following patent applications of Halbert P. Fischel:

Case A: Electrochemical Cells Utilizing Taylor Vortex Flows, application Ser. No. 12/800,658 of 20 May 2010, now U.S. Pat. No. 8,017,261 of 13 Sep. 2011;

Case A1: Electrochemical Cells Utilizing Taylor Vortex Flows, application Ser. No. 13/194,049 of 29 Jul. 2011, now U.S. Pat. No. 8,283,062 of 9 Oct. 2012, which is a division of application Ser. No. 12/800,658 (Case A), now U.S. Pat. No. 8,017,261 of 13 Sep. 2011;

Case A2: Galvanic Electrochemical Cells Utilizing Taylor Vortex Flows, application Ser. No. 13/235,480 of 18 Sep. 2011, now U.S. Pat. No. 8,187,737 of 29 May 2012, which is a continuation-in-part of application Ser. No. 13/194,049 (Case A1), now U.S. Pat. No. 8,283,062 of 9 Oct. 2012, which is a division of application Ser. No. 12/800,658 (Case A), now U.S. Pat. No. 8,017,261 of 13 Sep. 2011;

Case B: Fuel Reformers Utilizing Taylor Vortex Flows, application Ser. No. 12/800,710 of 20 May 2010, now U.S. Pat. No. 8,187,560 of 29 May 2012;

Case C: Chemical Process Accelerator Systems Comprising Taylor Vortex Flows, application Ser. No. 12/800,657 of 20 May 2010, now U.S. Pat. No. 8,147,767 of 3 Apr. 2012;

Case D: Direct Reaction Fuel Cells Utilizing Taylor Vortex Flows, application Ser. No. 12/800,672 of 20 May 2010, now U.S. Pat. No. 7,972,747 of 5 Jul. 2011;

Case E: Dynamic Accelerated Reaction Batteries, application Ser. No. 12/800,709 of 20 May 2010 with Philip Michael Lubin and Daniel Timothy Lubin, now U.S. Pat. No. 7,964,301 of 21 Jun. 2011.

Case F1: Cross-Flow Electrochemical Batteries, application Ser. No. 13/171,080 of 28 Jun. 2011, now U.S. Pat. No. 8,158,277 of 17 Apr. 2012, claiming benefit of U.S. Provisional Patent Application No. 61/388,359 filed 30 Sep. 2010, and of International Patent Application No. PCT/US10/39885 filed 25 Jun. 2010, which is a continuation-in-part of U.S. patent application Ser. Nos. 12/800,658 (Case A now U.S. Pat. No. 8,017,261 of 13 Sep. 2011); 12/800,710 (Case B now U.S. Pat. No. 8,187,560 of 29 May 2012); 12/800,657 (Case C now U.S. Pat. No. 8,147,767 of 3 Apr. 2012); 12/800,672 (Case D now U.S. Pat. No. 7,972,747 of 5 Jul. 2011); and 12/800,709 (Case E now U.S. Pat. No. 7,964,301 of 21 Jun. 2011)—all filed on 20 May 2010; and Case G: Thick Electrode Direct Reaction Fuel Cells Utilizing Cross Flows and Taylor Vortex Flows, application Ser. No. 13/174,686 of 30 Jun. 2011, now U.S. Pat. No. 8,124,296 of 28 Feb. 2012, claiming benefit of U.S. Provisional Patent Application No. 61/388,359 filed 30 Sep. 2010.

COMMON OWNERSHIP OF RELATED APPLICATIONS

Halbert Fischel is an inventor of all of the applications and patents enumerated above. All rights to this application and all of the enumerated applications and patents, including all of the inventions described and claimed in them, have been assigned to the same assignee of this application so that there was common ownership of all of these applications and patents at the time the invention described and claimed below was made.

FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF INVENTION

1. Field of the Invention

This invention is in the field of galvanic electrochemical cells used to convert chemical energy into electrical energy (e.g. fuel cells) or store electrical energy as chemical energy (e.g., batteries and flow cells) having means to provide relative motion between an element and an electrolyte—including means for creating Taylor Vortex Flows (TVF) and Circular Couette Flows (CCF) in the electrolyte (U.S. Class 429/69,72; Int. Class H01M-2/38, 2/12) to promote generation of alternating current electricity.

2. Description of Related Art

Two methods of converting chemical energy into electrical energy are a) burning fuel (e.g., coal, natural gas, liquid hydrocarbons) with oxygen to create heat in a motor or engine used to provide mechanical power to an electrical generator or alternator and b) promoting a reduction-oxidation (redox) reaction in a chemical cell that generates an electrical current in a circuit external to the cell. The former method can provide direct current (DC) or alternating current (AC); however, the process is Carnot $\Delta T$ temperature-limited by materials and therefore efficiency of burning fuel for electrical energy is low in accordance with the Second Law of Thermodynamics. The latter method is also constrained by the Second Law of Thermodynamics (in that entropy change, $T\Delta S$, at chemical and thermal equilibrium can approach H, enthalpy—G, Gibbs free energy) and therefore can be highly efficient; but, until now, has been restricted to DC electrochemical reactors. This Specification describes novel galvanic electrochemical cells for generating alternating current electricity.

Galvanic electrochemical cells include fuel cells used to convert chemical energy into electrical energy through use of catalysts as well as batteries and flow cells used to store electrical energy in chemical form through reversible reactions (secondary cells) or irreversible reactions (primary cells) promoted by faradaic materials that support reduction-oxidation (redox) chemical reactions. Galvanic cells produce electricity through spontaneous reactions and are distinguished from electrolytic electrochemical cells that require electrical energy to initiate and sustain electrochemical reactions (e.g., electrowinning) that are usually irreversible. Also, electrolytic cell electrodes do not contain faradaic or catalytic materials.

As used here, the term galvanic materials includes faradaic materials that chemically participate in redox reactions and catalytic materials that support redox reactions but are not chemically altered as a result. In general, galvanic cells comprising, in one case, a pair of electrodes comprising faradaic materials that promote two-phase (metal-electrolyte) reactions or, in another case, three-phase (catalyst-fuel or oxidizer-electrolyte) electrochemical reactions. These reactions separate electrons or ions from atoms or molecules, which then become energized ions (e.g., protons). The electrons travel from one electrode to the other electrode through an external electrical circuit where work is performed while the ions travel through a fluid electrolyte between the electrodes.

Patent publications and patents of Halbert Fischel enumerated above—as well as prior art references cited in them—describe examples of galvanic cells that generate DC electricity. Other disclosures well known to persons of ordinary skill in the art teach how to connect DC sources to external circuits, here called 'inverters', containing at least one electrically-reactive-impedance component (e.g., a capacitor or an inductor such as a transformer) for storing electrical or magnetic energy to obtain AC electricity. These inverters usually contain a switch located in a circuit between the galvanic cell and the reactive-impedance component to interrupt the flow of DC current to the reactive-impedance component. Early on, such switches comprised a vibrating reed supporting an electrical contact that periodically touched a fixed contact in a component then called a 'vibrator'. More recently, circuit interruption has been accomplished with solid-state components such as thyristors, silicon-controlled-rectifiers (SCRs) and integrated gate transistors such as metal-oxide-silicon-field-effect-transistors (MOSFETs).

One principal disadvantage of vibrator, thyristor, SCR, MOSFET and similar switches is that they waste galvanic cell energy by generating undesirable alternating harmonic currents (generally at odd multiple frequencies of the switch frequency) that do not contribute to output AC and must be dissipated as heat energy. These alternating harmonic currents may also combine to create high peak voltages, currents and energies that require more-costly or additional inverter components to dissipate. Some inverters waste energy when needing to commutate their switches to change states (e.g., by turning one switch to on to force a complementary switch to turn off). In the end, inverter design contains tradeoffs between conversion efficiency and manufacturing costs. This invention focuses on changing galvanic cell architecture and method of operation in order to simplify or remove a need for the switches and the inverters and to improve efficiency of generating alternating current electricity from chemical fuel sources.

GENERAL DESCRIPTION OF THE INVENTION

Case A2 teaches galvanic electrochemical cells using Taylor Vortex Flows (TVF) and Circular Couette Flows (CCF) in thixotropic electrolytes to generate DC electricity. Those Case A2 cells comprise:
 a. a first outer cylinder-like current collector for connection to an external circuit;
 b. an second inner cylinder-like current collector for connection to the external circuit and located within the first outer current collector so as to define a gap between the current collectors;
 c. means for circulating a fluid thixotropic electrolyte in the gap;
 d. a cylinder-like, ion-porous particle filter located in the gap and dividing the gap between the outer and inner current collectors into outer and inner electrolyte chambers for flowing electrolyte in each of the chambers; and
 e. means for providing relative rotation between the filter and one of the current collectors to create flows in the electrolyte of at least one electrolyte chamber.

In some embodiments, the galvanic cell also comprises means for creating TVF in electrolyte in the other electrolyte chamber so that electrolytes in both the outer and inner electrolyte chambers have TVF. TVF can also generate CCF in the electrolyte chambers.

The present invention adds the following improvements to Case A2 galvanic cells:
 a. one cylinder-like current collector contains two or more azimuthal conducting segments, may be porous and may contain embedded galvanic material particles;
 b. the other cylinder-like current collector may be porous and may contain embedded galvanic material particles having an electronegativity different from that of galvanic particles in the first current collector;
 c. means for circulating a fluid electrolyte (and/or fuel and oxidizer) through the porous electrodes and in the gap; and
 d. the cylinder-like, particle filter located in the gap contains both ion-porous and ion-non-porous sections.

In some embodiments, the galvanic cell also comprises means for creating TVF in electrolyte in the other electrolyte chamber so that electrolytes in both the outer and inner electrolyte chambers have TVF. TVF can also generate CCF in the electrolyte chambers.

The rotating filter of Case A2 generates TVF and CCF on all facing electrode and filter surfaces. This obviates a need to rotate electrodes as described in other Fischel cases enumerated above for that purpose and eliminates any need for a rotating electrical connection (e.g., commentators, slip rings, brushes) to an external electrical circuit. All of the benefits of ionic mass transport through a highly permeable particle filter are retained as well as the protective features of TVF that prevent crossover of constituents, such as particles and bubbles of fuel or oxidizer. Water, anolyte and catholyte volume management is preserved. In prior art galvanic architecture, the reaction rate, and hence current output, has been and remains limited by ion mass transport between electrode poles. By contrast in the galvanic cells of this invention, the reaction rate is limited by electron charge transfer to current collectors.

Some embodiments of this invention include galvanic cells having embedded galvanic (faradaic or catalytic) material particles secured with good electrical connection within their porous current collectors and circulating non-conductive electrolyte. Other embodiments incorporate solid current collectors and circulate thixotropic electrolyte suspensions of galvanic material particles that collide with the solid current collectors to transfer electrons. In either case flows—including TVF and CCF—greatly accelerate transfer of ions from one current collector through the ion-porous, rotating filter to the other electrode. In general, the secondary batteries of this invention will use thixotropic electrolyte suspensions while some fuel cell embodiments may use either architecture.

One characteristic of these cells is that the electrochemical reactions occur nearly orthogonally between the outer current collector and inner current collector and therefore depend on the permeability of the ion-porous filter along any straight line (e.g., radius) or plane (e.g., sagittal plane) between the inner and outer current collectors. If at any point along such a straight line or plane the filter is highly permeable or porous to ion migration, then output current from a segment of current collector intercept with the line or plane will be maximized; however, if the filter is ion-impermeable or non-porous, then the electrochemical reaction cannot proceed and output current will be minimized.

Similarly, the structure of the current collectors determines the magnitude of the output current. In order for a reaction to run to completion from any point on the surface of a current collector, a nearly orthogonal line from that point must intersect the surface of the other current collector. When it does so, the output current is increased; however, if the line does not intersect the other current collector, then output current is not increased.

Therefore, the structures of the filter and at least one of the current collectors constitute effective means for modulating output current to minimize or eliminate undesirable harmonic frequency currents. Additionally, they also provide means for modulating sinuous output current that simplifies or eliminates inverters.

It is therefore a first advantage of the present invention to provide an improvement over earlier galvanic cells by providing new galvanic cells that generate sinuous output currents.

A second advantage of the present invention is to provide ion-porous filters and current collectors that cooperate to produce sinuous output currents.

A third advantage of the present invention is to provide galvanic cells that do not require inverters for producing AC electricity.

A fourth advantage of the present invention is to provide galvanic cells that simplify design requirements and reduce costs in inverters for producing AC electricity.

These advantages are more fully set forth in the following descriptions of preferred embodiments of this invention.

BRIEF DESCRIPTIONS OF THE SEVERAL VIEWS OF THE DRAWINGS

FIG. 1 is a fragmentary view of a cross section of a galvanic battery cell similar to that as shown in FIG. 1A of Case A2.

FIG. 2A illustrates a perspective view of an outer stationary current collector. FIG. 2B is a perspective view of an inner rotating filter. FIG. 2C is a warp into a plan view of the interior of the outer stationary current collector. FIG. 2D is a warp into plan view of the exterior of the rotating filter. FIG. 2E is an oscillogram of primary electric currents from outer stationary current collector segments 'A' and 'B'. FIG. 2F is an oscillogram of the waveform of AC electric output voltage. FIG. 2G is a warp into a plan view of the interior of the outer stationary current collector with insulating mask.

FIG. 8 consists of three panels illustrating cross-sectional views of the alternating current galvanic battery of FIG. 7 taken along section lines a-a, b-b and c-c.

Figure 9A:
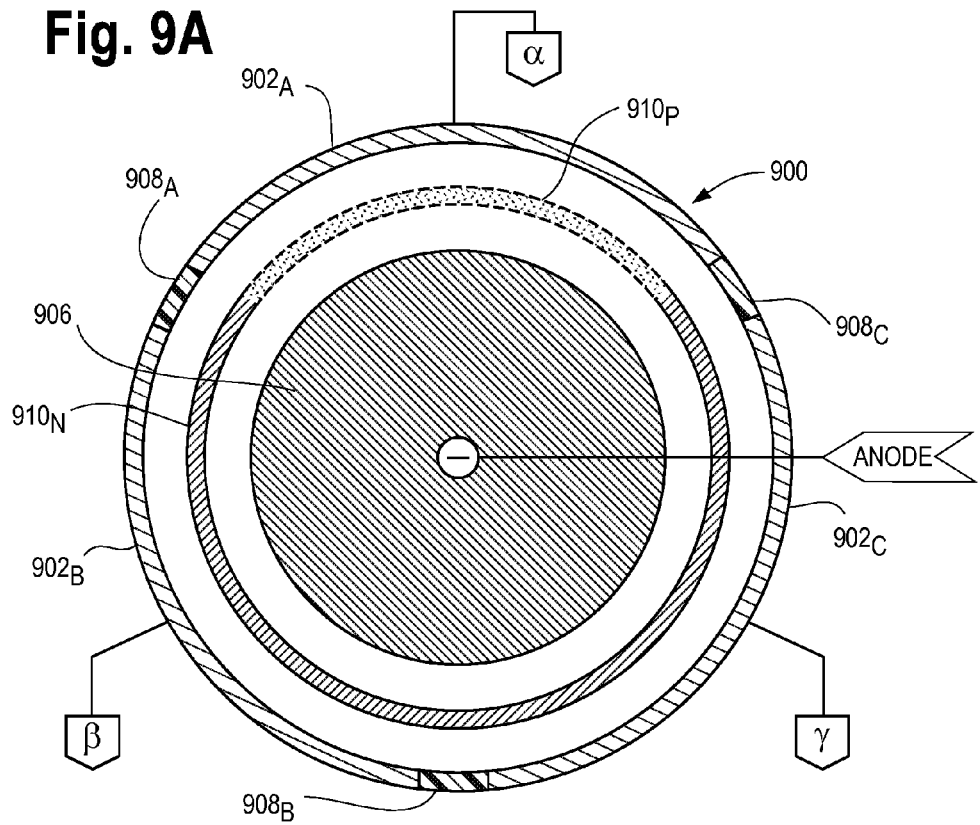

FIG. 9A is a cross-sectional view of an alternating current galvanic battery comprising three cathode current collectors for use with a three-phase wye-delta (Y-Δ) electrical distribution system.

Figure 9B:
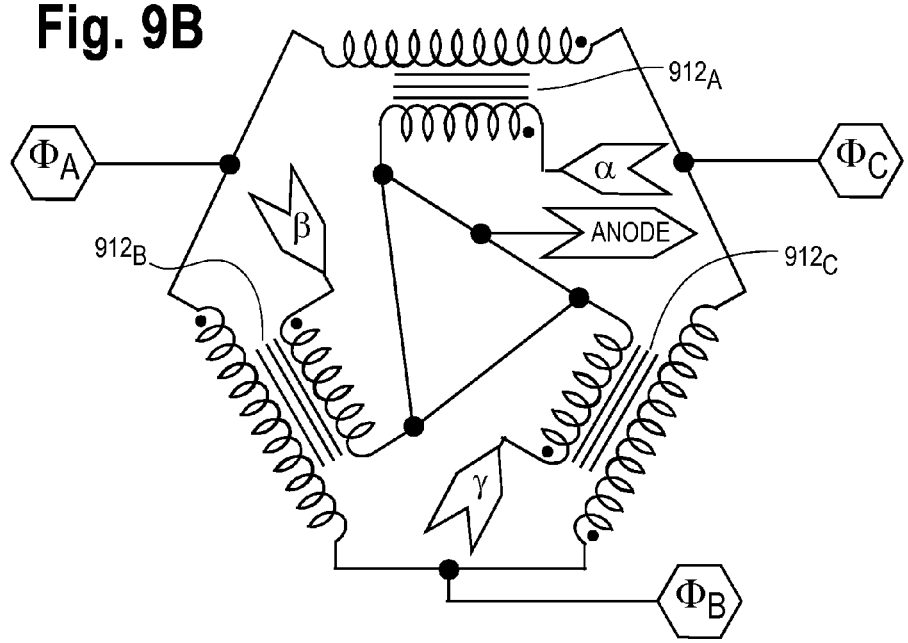

FIG. 9B is an electrical schematic of a three-phase wye-delta (Y-Δ) electrical distribution system for use with the alternating current galvanic battery of FIG. 9A.

DETAILED DESCRIPTION OF THE INVENTION

First Embodiment

Metal Hydride Battery

FIG. 1 a cross-sectional view of essential features of a preferred embodiment of an electrochemical cell 100 comprising a metal hydride battery 102 within case 104. Outer current collector 106 azimuthal segments 106A,B are secured to the case 104. The battery 102 is similar to the battery 102 of Case A2; however, the battery 102 of Case A2 has only one outer current collector 106 without multiple segments.

Figure 2A:
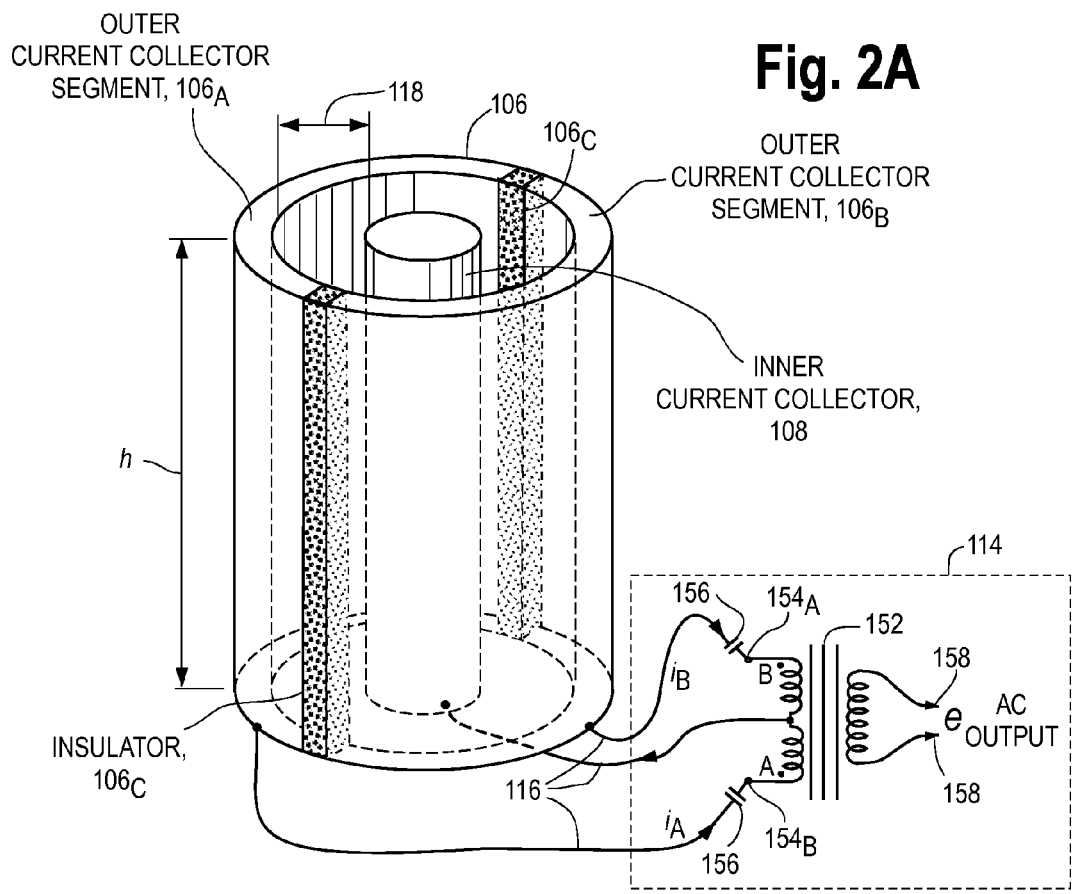

As seen in the perspective view of FIG. 2A, the two outer electrically conducting current collector azimuthal segments $106_A$ and $106_B$ have a height h. When both or any of segments $106_A$ and $106_B$ are referred to below, they may be identified as $106_X$. Each of the outer current collector segments $106_X$ has an azimuth angle of slightly less than 180°. The current collector segments $106_X$ are electrically isolated from each other by azimuthal insulator segments $106_C$ so as to form the outer current collector 106 cylinder. In the battery of Case A2, there is only one current collector 106 (FIG. 1 of Case A2) with a 360° azimuth angle.

A cylinder-like inner current collector 108 having a single azimuthal segment of 360° is also fixed to the case 104 and is within the current collector segments $106_X$ and insulators $106_C$. The conducting segments ($106_X$ and 108) are adapted for connection to an external electrical circuit 114. Each outer current collector segment $106_X$ is connected by positive terminal $110_{A,B}$ (battery CATHODES) and negative terminal 112 (battery ANODE), respectively, to external electrical circuit 114 by conductors 116. In the battery 100 of Case A2, there is only one positive terminal 110.

In this embodiment, the current collector segments $106_X$ and insulator $106_C$ form a coaxial right-circular cylinder as shown in FIG. 2A; however, these attributes are not a requirement and other cylinder-like geometries (e.g. elliptical, conical, hyperbolic, irregular, different axes) may be employed. The same is true for inner current collector 108.

Figure 2B:
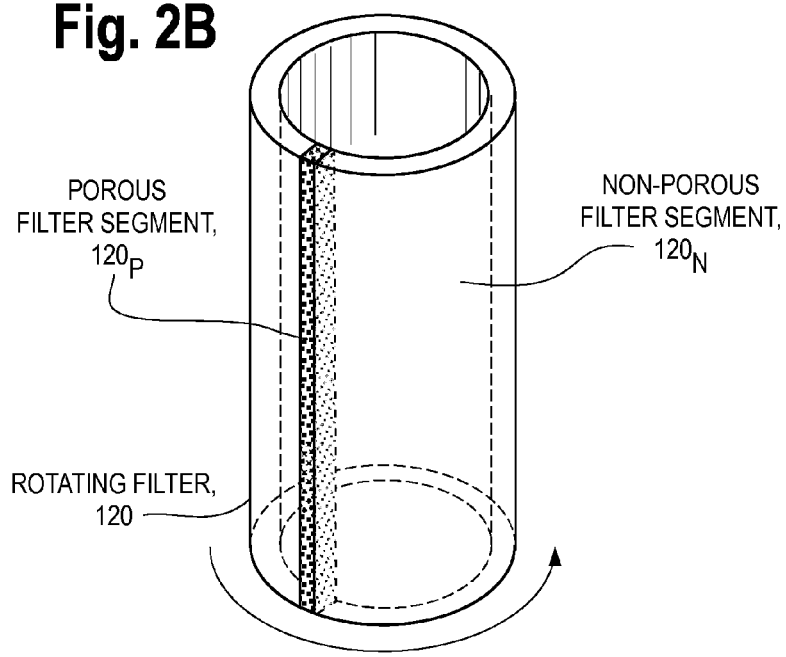

A gap 118 between the current collector segments $106_X$ and the inner current collector 108 is divided by a filter 120 into an outer electrolyte chamber 122 and an inner electrolyte chamber 124. The filter 120 in this embodiment is also a right-circular cylinder that is coaxial with the current collectors 106, 108; however, the filter 120 may be cylinder-like and it need only be approximately coaxial with the current collector segments $106_X$ insulator $106_C$ and inner current collector 108. The filter comprises two azimuthal segments that are shown in FIG. 2B; namely, a porous segment $120_P$ that is permeable to electrolyte and to ions; but, not to particles and an impenetrable segment $120_N$ that is impermeable to electrolyte, ions and particles.

Figure 5:
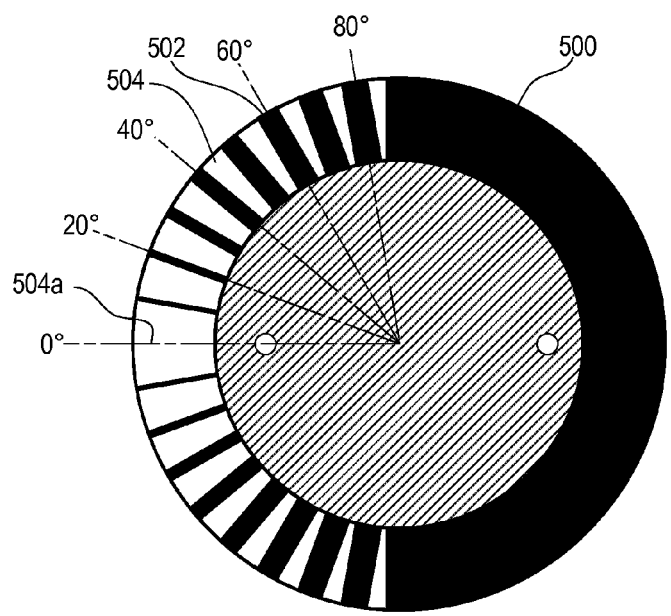
FIG. 5 is a top view of a sector wheel of the battery of FIG. 4.

As will be explained more fully below, the filter porous segment $120_P$ is permeable to the flow of electrolyte; but not particles. This feature distinguishes the filter $120_P$ from ion-permeable membrane 208 (e.g. NAFION® and LISICON™ ion-exchange or ion-conducting membranes) that is shown in FIG. 5 of Case E. and that is impermeable to electrolyte flow and to particles. Whereas NAFION® membranes only transport cations (e.g., protons) and limit the chemistries that can be employed to only those using acidic electrolytes (e.g., LISICON™, which is permeable only to Li cations in organic lithium salts), the filter porous segment $120_P$ can transport cations and anions and will work with both acidic or alkaline electrolytes.

In this embodiment, a catholyte flows in the gap 118 between the filter 120 and the outer current collectors $106_X$ and comprises a non-Newtonian or thixotropic fluid mixture of an electrolyte such as KOH and NiO(OH) particles (including highly conductive multi-walled carbon nanotube particles) as taught in Case A2. Similarly, an anolyte flows in the gap 118 between the filter 120 and the inner current collector 108 and comprises a thixotropic mixture of an electrolyte such as KOH and metal hydride (MH) particles as taught in Case A2. The catholyte and the anolyte particles each serve as electrodes because the catholyte and the anolyte particles comprise galvanic materials that are sites where two-phase galvanic reactions occur between the particle surfaces and the electrolyte when particles make momentary electrical contact with metal current collectors $106_X$. Both anolyte and catholyte suspensions may include dispersion or wetting agents (e.g., etidronic acid, also known as HEDP) and particles that facilitate electron charge transfer at metal electrode surfaces (e.g., cobalt).

As used here, the term galvanic materials include faradaic materials that support reduction-oxidation (redox) reactions and catalytic materials. In general, galvanic cells comprise, in one case, a pair of electrodes comprising faradaic materials that promote two (metal-electrolyte) or, in another case, three (catalyst-fuel or oxidizer-electrolyte) phase electrochemical reactions that separate electrons or ions (e.g., protons) from atoms or molecules. The electrons travel from one electrode to the other electrode through an external electrical circuit where work is performed while the ions travel through a fluid electrolyte between the electrodes. For thixotropic suspensions, the catholyte and the anolyte act as the electrodes where redox reactions occur and then give up or receive electrons when the catholyte or anolyte particles contact current collectors $106_X$. By separating the redox reactions of the electrodes from current collection, the redox reaction process and current collection function together with their supporting structures can be optimized.

Unlike the current collector segments $106_X$, insulator $106_C$ and inner current collector 108 that are fixed to the case 104, the filter 120 is journaled for rotation within the gap 118 between the current collectors $106_X$ and 108. The top of the filter 120 is secured to hub 126 that is fixed to the axle 128 of motor 130.

The outer electrolyte chamber 122 is filled with the catholyte. Similarly, the inner electrolyte chamber 124 is filled with the anolyte. In another embodiment, the positions of the anolyte and the catholyte could be exchanged, with appropriate changes in the polarities of the terminals $110_X$ and 112.

The catholyte circulates through a recirculation chamber 132—as shown by wavy dashed line 134. Optional pump 136 can be incorporated to accelerate catholyte flow. Similarly, the anolyte circulates through a recirculation chamber 138—as shown by the wavy dashed line 140. Optional pump 142 can be incorporated to accelerate anolyte flow. The recirculation chambers 132, 138 can be made larger than the electrolyte chambers 122, 124 to provide reservoirs of large volumes of catholyte and anolyte.

The filter 120 serves three principal functions. First, it prevents catholyte and anolyte particles, described in Case A2, from intermingling or crossing through the filter—as will be explained further below. Second, the filter 120 rotates between the outer electrolyte chamber 122 and the inner electrolyte chamber 124 to generate outer electrolyte chamber 122 flows, such as TVF 144, and inner electrolyte chamber 124 flows, such as TVF 146. Where TVF 144, 146 are generated, outer electrolyte chamber CCF 148 and inner electrolyte chamber CCF 150 can be generated, as described in Case A and Case A2. Third, the filter 120 cooperates with at least one of the current collector segments 106A, B or current collector 108 to modulate output current, as will be more fully explained below.

The battery cell 102 is operated to produce electricity for transmission to the external electrical circuit 114 by a process comprising:

1. Filling the outer electrolyte chamber 122 with catholyte;
2. Filling the inner electrolyte chamber 124 with anolyte; and
3. Rotating the filter 120 at a rate of rotation adequate to cause—
   a. catholyte flows, such as TVF 144 and CCF 148, to form in the outer electrolyte chamber 122 catholyte, and
   b. anolyte flows, such as TVF 146 and CCF 150, to form in the inner electrolyte chamber 124 anolyte, Additionally, the optional catholyte pump 136 and the optional anolyte pump 142 may be operated to provide additional axial flow through the outer electrolyte chamber 122 and inner electrolyte chamber 124, respectively. Alternatively, the filter 120 can be rotated at a speed that will not produce TVF 146 or CCF 150; however, the battery cell 102 will generate less electrical current.

Recall that FIG. 2A is a partial perspective view of a portion of cell 100 of FIG. 1 that shows the relationship between the outer current collector segments 106A,B, insulator $106_C$ and inner current collector 108, as well as a portion of external electrical circuit 114. FIG. 2B is a partial perspective view of the rotating filter 120 comprising the porous segment $120_P$ and the non-porous segment $120_N$. The filter 120 is to be journaled for rotation in the gap 118.

Figure 2C:
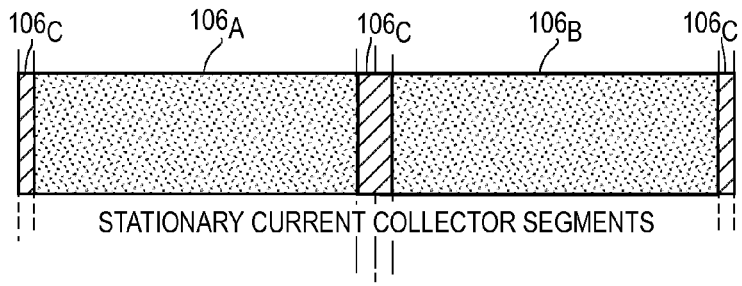
Figure 2D:
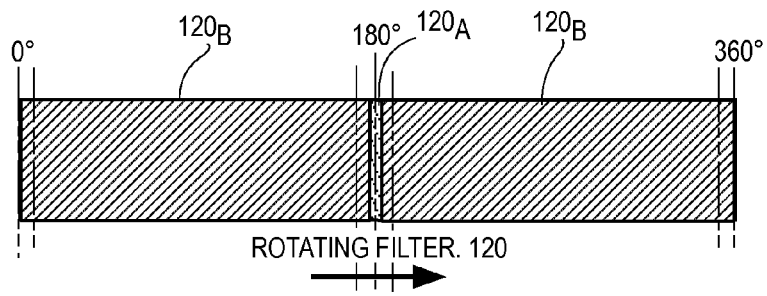

FIG. 2C illustrates the inner surfaces of the outer current collector segments $106_X$ and insulator $106_C$ that have been warped into a flat plane extending between 0° and 360°. Similarly, FIG. 2D illustrates the outer surface of the filter 120 warped into a flat plane extending between azimuthal angles of 0° and 360° and highlights the porous segment $120_P$, also labeled $120_A$, and the non-porous segment $120_N$, also labeled $120_B$.

The electrochemical reaction can only run to completion and generate electricity near a sagittal plane that passes through the porous segment $120_P$ of the filter 120 and is approximately orthogonal to both the inner current collector 118 and one of the outer current collector segments $106_X$. Otherwise, little or no electricity is produced.

Figure 2E:
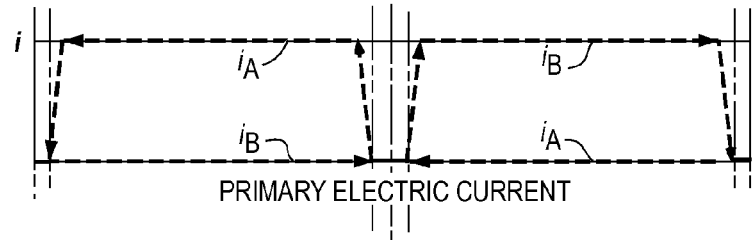

As the porous segment $120_P$ of the filter 120 rotates within the gap 118 between the current collectors 106A,B and 108, the output currents $i_A$ and $i_B$ flowing in the current collectors $106_{A,B}$ go from minimum to maximum and back to minimum as shown in FIG. 2E. The currents $i_A$ and $i_B$ are approximately the convolutions of the filter segment $120_P$ against the outer current collector segments $106_{A,B}$ and the insulator $106_C$. These direct currents $i_A$ and $i_B$ have pulsating, square-wave-like waveforms that can be transformed into alternating current voltages.

Figure 2F:
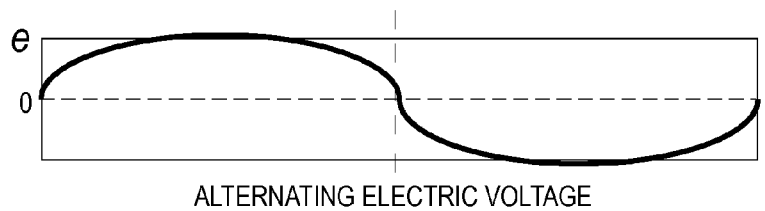

As shown in FIG. 2A, the pulsating direct output currents $i_A$ and $i_B$ are applied to the external electrical circuit 114 transformer 152 opposing primary winding terminals $154_{A,B}$ through capacitors 156. The series-resonant circuit of the capacitors 156 and the transformer 152 has a minimum impedance at its resonant frequency and reduces harmonic energy current components at other frequencies. The currents $i_A$ and $i_B$ return to the inner current collector 108 via a center tap of the transformer 152 primary winding. When the pulsating direct output currents $i_A$ and $i_B$ are applied to the energy storage, series-resonant circuit of reactive-impedance components including the transformer 152 primary winding and the capacitors 156, then an alternating current output voltage e appears across transformer 152 AC output terminals 158—as shown in FIG. 2F.

Note that the alternating current voltage appearing at transformer AC output terminals 158 was obtained without any vibrator, thyristor, SCR, MOSFET or similar current-interrupting switch that would introduce both additional cost and an overvoltage that would reduce cell 100 output voltage. Because the non-porous filter segment $120_N$ prevents the galvanic reaction from running to completion, the transformer 152 primary winding back emf voltage appearing at the other of the outer current collector segments $106_X$ will not cause much of a chemical reaction. Nevertheless, isolating diodes (not shown) optionally can be installed in series between the outer current collector segments $106_X$ and the capacitors 156 with diodes' cathodes connected to the capacitors 156 to reduce the emf voltage in this embodiment. These diodes will introduce an overvoltage that will reduce the cell 100 output voltage.

Also note that while the waveform is not sinusoidal, it is a sinuous wave that approximates a sinusoidal wave and therefore will contain less undesirable harmonic energy to be lost as heat than would be present with current-interrupting switch in the transformer 152 primary winding circuit. The undesirable harmonic energy can be reduced by careful design of the transformer 152 and careful selection of capacitors 156 values and types.

Figure 2G:
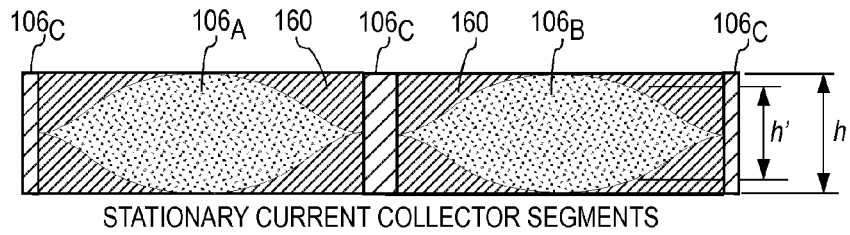

Another option is to tailor the conducting profiles of the outer current collector segments $106_X$ as shown in FIG. 2G. Insulating mask 160 covers the interior surface of the outer current collector segments $106_X$ so that height h' of the conducting portion of the outer current collector segments $106_X$ varies as a function of azimuth angle. The conducting portion of the outer current collector segments $106_X$ of FIG. 2G vary as a sine wave and therefore the waveform of the alternating current output voltage e will have very little harmonic energy content. Of course a price that must be paid is that the output current of the will be reduced to about 71% of the current that would have been available in the absence of the mask 160; but, that may be preferable in some installations where heat, electrical noise or component count must be minimized.

Second Embodiment

Fuel Cell Battery

Figure 3A:
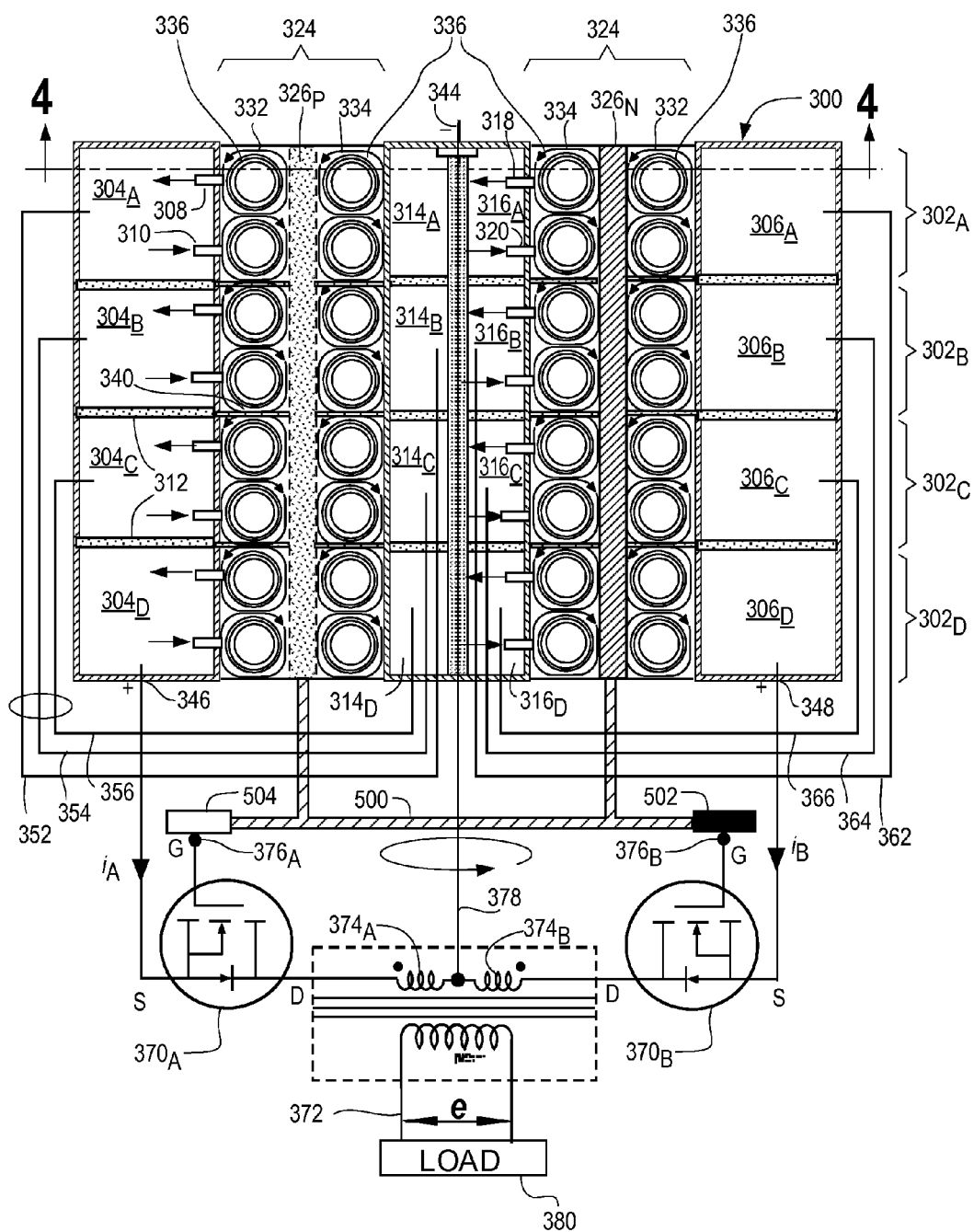
FIG. 3A is an electrical and mechanical schematic drawing of a galvanic fuel cell battery comprising four cells connected in series and connected to its load through a transformer.
Figure 3B:
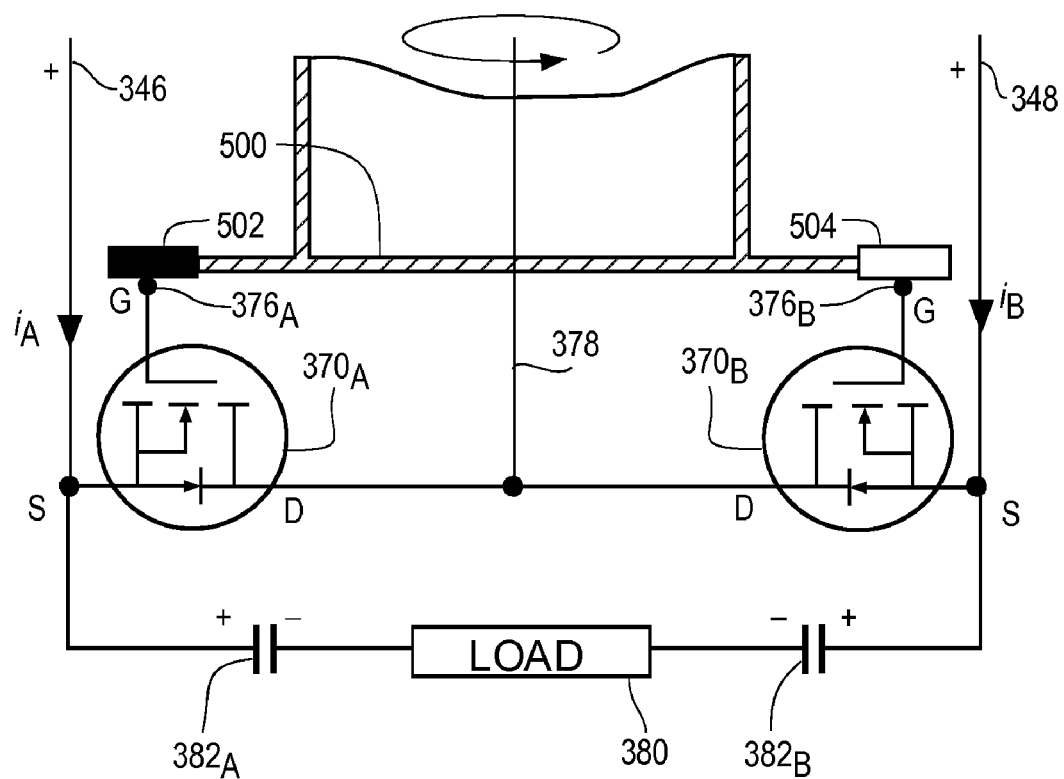
FIG. 3B is an electrical schematic drawing illustrating a circuit for connecting the fuel cell battery of FIG. 3A to its load through capacitors.
Figure 4:
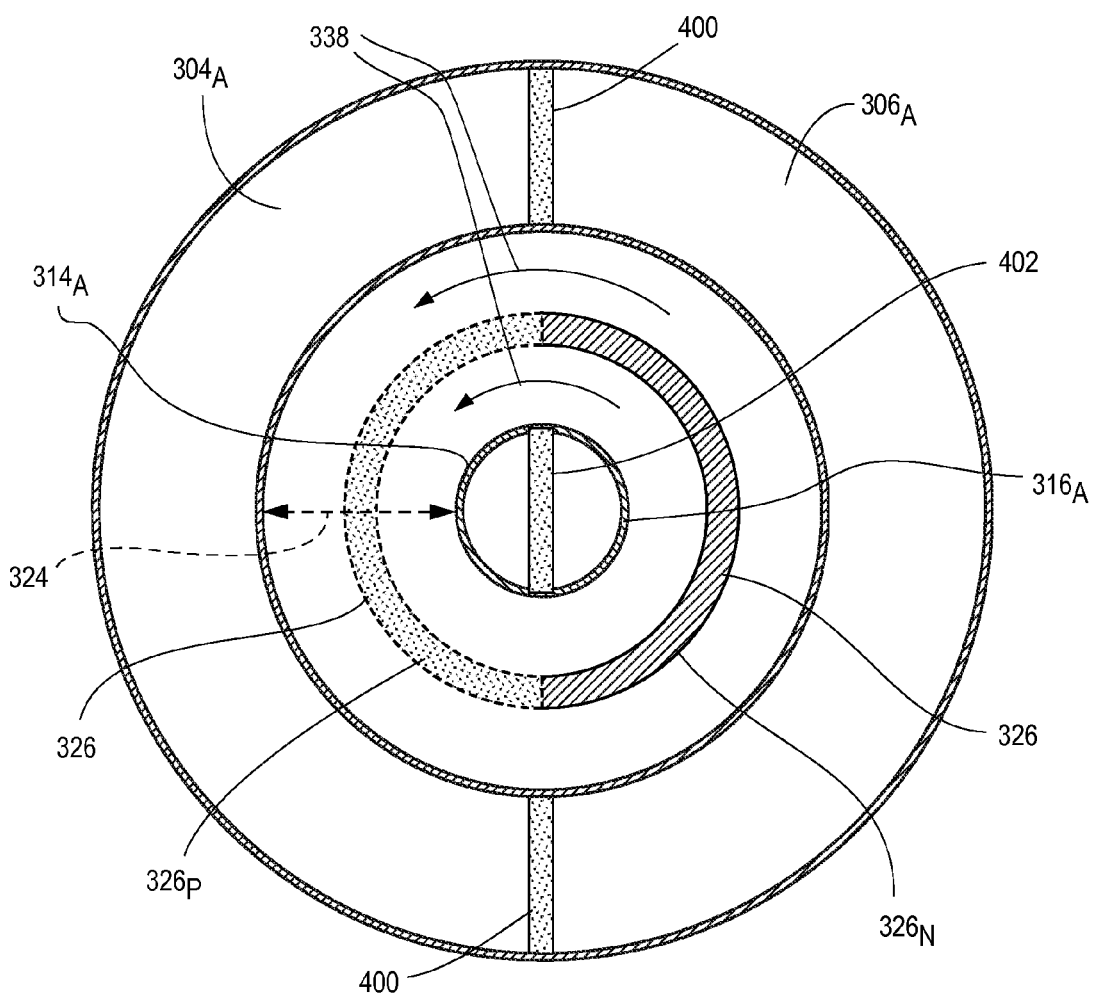
FIG. 4 is cross-sectional view of the galvanic fuel cell battery of FIG. 3 taken along the section line 4'-4'.

FIG. 3A is an electrical and mechanical schematic drawing of a galvanic fuel cell battery 300 comprising four individual cells $302_{A, B, C, D}$ (sometimes identified as $302_X$ where X can stand for any or all of A, B, C, ...) connected in series. The drawing illustrates structural and functional relationships plus electrical circuits. In practice, these fuels cells have constructions similar to those of FIG. 1 and those of Case A Case D and Case G. FIG. 4 is a cross-sectional view of the cell $302_A$ taken at cross-section line 4'-4' in FIG. 3.

The cell 302A comprises outer current collector segments $304_{A,B,C,D}$ on its left side and outer current collector segments $306_{A,B,C,D}$ on its right side. All of the outer current collector segments form a circular cylinder.

Each of the outer current collector segments $304_{A, B, C, D}$, $306_{A, B, C, D}$ contains an outer current collector input port 308 and an outer current collector output port 310. Only the ports 308 and 310 in cell $302_A$ are shown with reference numbers to reduce drawing congestion; however, each of the outer current collector segments $304_X$, $306_X$ contains one each of the ports 308 and 310.

The outer current collector input ports 308 are each connected to Balance of Plant (BOP) by connections that are not shown. Similarly, the outer current collector output ports 310 are each connected to the BOP by connections that are not shown.

The BOP supplies a mixture of fuel (e.g., methanol or other fuel described in Case D) and electrolyte (e.g., KOH) to the outer current collector input ports 308. The BOP receives unspent fuel, reaction products and electrolyte from the outer current collector output ports 310.

Each of the outer current collector segments $304_X$, $306_X$, and inner current collector segments $314_X$, $316_X$ is insulated from vertically adjacent current collector segments by an electrical insulator 312. As will be described below, this permits the current collector segments $304_X$, $306_X$, $314_X$, $316_X$ to be connected in series in order to obtain an increase fuel cell voltage. Each of the outer current collector segments $304_X$ is insulated from each of the outer current collector segments $306_X$ by an insulator 400 (FIG. 4). Similarly, each of the inner current collector segments $314_X$ is insulated from each of the inner current collector segments $316_X$ by an insulator 402 (FIG. 4).

The cell 302A also comprises inner current collector segments $314_X$ on its left side and inner current collector segments $316_X$ on its right side. All of the outer current collector segments are electrically insulated from each other and form a circular cylinder within the outer current collector segments $304_X$, $306_X$.

Each of the inner current collector segments $314_X$, $316_X$ contains an inner current collector input port 318 and an inner current collector output port 320. Only the ports 318 and 320 in cell $302_A$ are shown with reference numbers to reduce drawing congestion; however, each of the inner current collector segments $314_X$, $316_X$ contains one each of the ports 318 and 320.

The inner current collector input ports 318 are each connected to BOP by connections that are not shown. Similarly, the outer current collector output ports 320 are each connected to the BOP by connections that are not shown.

The BOP supplies a mixture of oxygen and electrolyte (e.g., KOH) to the inner current collector input ports 318. The BOP receives unspent oxygen, reaction products and electrolyte from the outer current collector output ports 320.

Both the outer current collector segments $304_X$, $306_X$ and the inner current collector segments $314_X$, $316_X$ are static; that is, they do not move. A cylindrical gap 324 separates the inner current collector segments $314_X$, $316_X$ from the outer current collector segments $304_X$, $306_X$.

Journaled for rotation (by a motor not shown) within the gap 324 is a rotating circular filter cylinder 326 (seen in FIG. 4 cross-sectional view) containing a porous section $326_P$ and a non-porous section $326_N$, each having an azimuth angle of 180°. The rotating circular filter 326 divides the cylindrical gap 324 into an outer electrolyte chamber 332 contiguous to the outer current collector segments $304_X$, $306_X$ and an inner electrolyte chamber 334 contiguous to the inner current collector segments $314_X$, $316_X$.

As described in Case A2, rotation of the circular filter cylinder 326 generates TVF 336 (FIG. 3A) in the electrolyte chambers 332, 334. The TVF 336 cause CCF 338 (FIG. 4) to form. As described for the first embodiment illustrated in FIGS. 1 and 2A, rotating the circular filter cylinder 326 to generate TVF and CCF is desirable because it maximizes the fuel cell 300 current output; however, rotation at other speeds will also generate alternating current electricity.

The electrolyte chambers 332, 334 for each of the cells $302_X$ are separated vertically from adjacent electrolyte chambers 332, 334 for by horizontal insulators 340 (identified in cell 304B) that may be porous or non-porous to electrolyte flow; but not to particles in the electrolyte. Porous insulators 340 may be advantageous in some embodiments because they facilitate balancing of pressures within the electrolyte chambers 332, 334.

The fuel cell 302 has a negative terminal (−) 344 and two positive terminals (+) 346 (left) and 348 (right). The negative terminal 344 is electrically connected to inner current collector segments $314_A$ and $316_A$. The left positive terminal 346 is electrically connected to the outer current collector segment $304_D$ and the right positive terminal 348 is electrically connected to the outer current collector segment $306_D$.

The current collectors are connected in a series circuit according to the following schedules showing current collector segment and conductor reference numerals:

| LEFT | RIGHT |
|---|---|
| $304_A$-$314_B$ via 352 | $306_A$-$316_B$ via 362 |
| $304_B$-$314_C$ via 354 | $306_B$-$316_C$ via 364 |
| $304_C$-$314_D$ via 356 | $306_C$-$316_D$ via 366 |

If, for example, output voltage of a single cell $302_X$ is 1.5-volts, then the output voltage of a four-cell fuel cell such as the fuel cell 300 will be 6.0-volts. This output voltage will be pulsating direct current—as will be described below.

As described above, the battery 100 contains thixotropic electrolyte particles that support two-phase (particle surface and electrolyte) redox reactions. The fuel cells $302_X$ contain thixotropic electrolytes that support three-phase (fuel-catalyst particle surface-electrolyte) reactions because the particle surface contains a catalyst. Because there is no proton exchange membrane with a temperature limit of 160° C. that requires a Platinum Metal Group catalyst, the operating temperature can exceed 250° C. and nickel can be used on the surfaces of the particles as a catalyst—as described in more detail in Case A2.

Just as is the case for the battery 100, the chemical reactions for the cells $302_X$, the electrochemical reaction can only run to completion and generate electricity near a sagittal plane that passes through the porous segment $326_P$ of the filter 326 and is approximately orthogonal to both the inner current collector segments $314_X$, $316_X$ and the outer current collector segments $304_X$, $306_X$. Otherwise, little or no electricity is produced.

As the porous segment $326_P$ of the filter 326 rotates within the cylindrical gap 324 between the current collector segments $304_X$, $306_X$, the output currents flowing in the current collector segments $304_X$, $306_X$ go from minimum to maximum and back to minimum. As will be described later, these currents can be pulse-width modulated and transformed into alternating current output voltages.

Output currents $i_A$ and $i_B$ are applied to an external electrical circuit comprising integrated gate transistors $370_{A,B}$ and transformer 372 opposing primary windings $374_{A,B}$. In this embodiment, the transistors $370_{A,B}$ are metal-oxide-silicon-field-effect-transistors (MOSFETs) that have fast switching times, low source (S)-to-drain (D) resistance ($R_{SD}$) and high gate (G) sensitivity to signals from external sensors, such as sensors $376_{A,B}$. The transistors $370_{A,B}$ are used to pulse-with-modulate the output currents $i_A$ and $i_B$, as will be described below. The currents $i_A$ and $i_B$ return to the negative terminal 344 via a center tap of the transformer 372 primary winding and conductor 378. When the pulse-width-modulated output currents $i_A$ and $i_B$ that are 180° out of phase are applied to the transformer 372 primary winding, then an alternating current output voltage e appears across transformer 372 AC output terminals for connection to an external load 380.

Suspended for rotation with the rotating circular filter cylinder 326 and below the cell $302_D$ is a sector wheel 500 that is used to generate signals needed by the transistors $370_X$ to pulse-width modulate the output currents $i_A$ and $i_B$. As shown in FIG. 5, the sector wheel 500 periphery has both black segments 502 and white segments 504. When the white segments 504 are detected by the sensors $376_X$, their respective transistors $370_X$ must switch to full conduction and their currents $i_{A,B}$ are at maxima. When the black segments 502 are detected by the sensors $376_X$, their respective transistors $370_X$ must switch to zero conduction and their currents $i_{A,B}$ are at minima.

As shown in FIG. 5, the white segments 502 are distributed approximately 180° around the periphery of the sector wheel 500. The widths of the white segments 504 vary sinusoidally with respect to their angular deviation from 0° where a white segment 504a at 0° is of maximum width. As can be seen by comparing FIGS. 3A, 4 & 5, only one of the sensors $370_{A,B}$ can detect a white segment 504 at any instant in time so that only one of the transistors $370_{A,B}$ can be conducting at any instant in time. Therefore, only one of the transformer 372 primary windings $374_{A,B}$ can be energized by the currents $i_{A,B}$ at any instant.

Because the current $i_B$ flowing through the primary winding $374_B$ in an opposite direction to that of the current $i_A$ through the primary winding $374_A$, the magnetic flux in the transformer 372 core continuously reverses. This reversal causes alternating current to be generated in the transformer 372 secondary winding.

Figure 6:
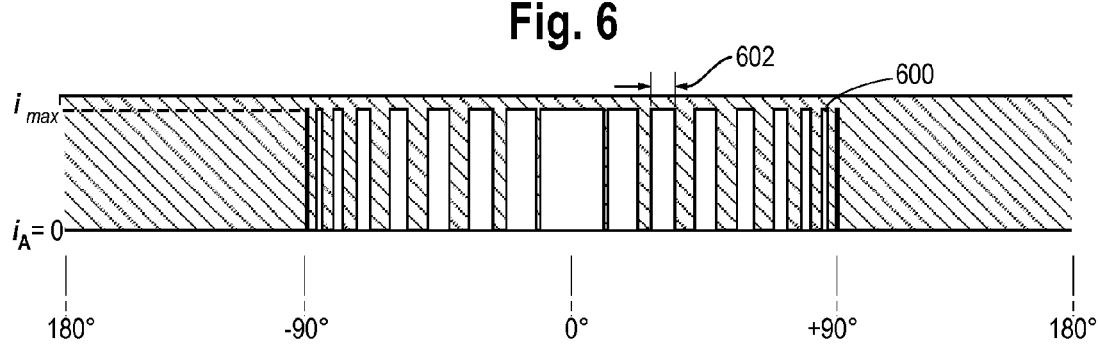
FIG. 6 is an oscillogram showing the waveform of pulse-width modulated primary electric currents from outer stationary current collector segments when switched in response to signals sensed from the sector wheel of FIG. 5.

FIG. 6 is an oscillogram 600 of the waveform of the current $i_A$ flowing from the transistor $370_A$. The oscillogram 600 displays the height of the waveform in proportional to the magnitude of a voltage or a current (e.g., $i_A$, $i_B$). In the case of the oscillogram 600 waveform, the magnitude of the current $i_A$ is zero when one of the black segments 502 is detected by one of the sensors $376_A$ connected to one of the transistors $370_A$. The current $i_A = i_{max}$ when the one of the white segments 504 is detected by one of the sensors $376_A$ connected to one of the transistors $370_A$. This switching method is called pulse width modulation. Here, the widths of the pulses or their dwell angles 602 at $i_A = i_{max}$ are sinusoidally distributed according to their positions in time.

While the dwell angles 602 of the pulse width modulation waveform 600 are not perfectly sinusoidally distributed, the cumulative current $i_A$ as a function of time approximates a sinusoidal wave and therefore it will contain less undesirable harmonic energy to be lost as heat than would be present with current-interrupting switch having a constant dwell angle in circuit with the transformer 372 primary windings $374_X$. The undesirable harmonic energy can be reduced by careful design of the transformer 372 or the addition of capacitors (not shown) to form a resonant circuit. The description for the current $i_A$ also applies to the current $i_B$, which is 180° out of phase with the current $i_A$.

The integrated gate transistors $370_X$ and transformer 372 circuit of FIG. 3A is one alternative for connecting the fuel cell battery 300 to its load 300. An alternative circuit is shown in FIG. 3B that is a topological dual of the circuit shown in FIG. 3A. Structural and circuit element numbers in FIG. 3B are the same as those for FIG. 3A where the elements are the same or equivalent.

Referring to FIG. 3B, its circuit is connected to the fuel cell battery 300 of FIG. 3A by the cell terminals 344, 346 and 348. The integrated gate transistors $370_{A,B}$ of FIG. 3B are connected directly between the terminals 346 and 344 and between the terminals 348 and 344, instead of in series with the transformer windings $374_{A,B}$ of FIG. 3A. Also, the sector wheel 500 is rotated 180° from its position shown in FIG. 5 so that the white segments 504 are now aligned with the non-porous section $326_N$ of the rotating circular filter cylinder 326 of FIG. 4. Thus in FIG. 3B, the black segment 504 is shown adjacent sensor $376_A$ and the white segment 502 is shown adjacent sensor $376_B$.

The circuit of FIG. 3B operates to charge capacitors $382_{A,B}$ when a black segment 502 is sensed by the sensors $376_X$, which causes the associated integrated gate transistors $370_{A,B}$ to switch to their open or high-resistance states. When a white segment 504 is sensed by the sensors $376_X$, the associated integrated gate transistors $370_X$ switch to their short or low-resistance states so that potential of the capacitor $382_X$ '+' plate drops to that of the negative terminal 344. Because voltage across the capacitors $382_X$ cannot change instantaneously with respect to time, the potential at the capacitor $382_X$ '−' plate must drop by an equal, but negative, amount.

The capacitors $382_X$ may be supercapacitors or ultracapacitors because the capacitance of the capacitors $382_X$ must be sufficiently large so that the capacitors $382_X$ only discharge by about one-half of their charge when the integrated gate transistors $370_X$ are not conducting. The remaining one-half charge is used when the when the integrated gate transistors $370_X$ are conducting and its associated capacitor $382_X$ '−' plate is at a negative potential with respect to the potential of the other capacitor $382_X$ '−' plate. Because this relationship changes for each 180° revolution of the rotating circular filter cylinder 326 and the sector wheel 500, the load 380 is powered by alternating current.

A choice of whether to use the circuit of FIG. 3A or the circuit of FIG. 3B largely depends on extrinsic factors, including, size, weight, cost, electromagnetic radiation, load intolerance to harmonic energy, load impedance, output voltage, temperature, shock and energy losses. The choice of energy storage components (e.g., transformer 372, capacitors $382_X$) is influenced by the impedance of the load 380. Inductors (e.g., transformer 372) are low-impedance elements at low frequencies that store energy in magnetic fields. The capacitors $382_X$ are high-impedance elements at low frequencies that store energy in electric fields. Performance can often be optimized by incorporating both types of components to construct resonant circuits that minimize harmonic energy reaching loads 380.

One significant advantage over prior art inverter circuits is that there is no need to commutate one-half of a circuit to off by turning the other half to on. Many conventional inverter circuits comprise two halves that are alternately switched between states and require that direct current be supplied simultaneously to both halves. Thus, energy in one half is used to commutate the other half in order to force it to switch states. Commutation wastes energy because there is a short period time when both halves are in the on state and in opposition to each other. That does not occur in the galvanic cells of this invention because they inherently generate pulsed currents where one current ($i_{A,B}$) is zero when another current ($i_{B,A}$) is not zero.

Another significant advantage over prior art inverter circuits is that the pulsed current produced by the galvanic cells of this invention can be modulated by controlling galvanic reactions with the porous section $326_P$ and the non-porous section $326_N$ of the rotating circular filter cylinder 326 to produce sine-wave-like currents ($i_{A,B}$). This feature avoids any need for commutation, saves fuel otherwise spent in commutation, reduces heat loss, decreases harmonic energy losses and allows the switches $370_{A,B}$ to change states when the currents ($i_{A,B}$) are at a minimum.

Third Embodiment

Two-Phase Fuel Cell

Figure 7A:
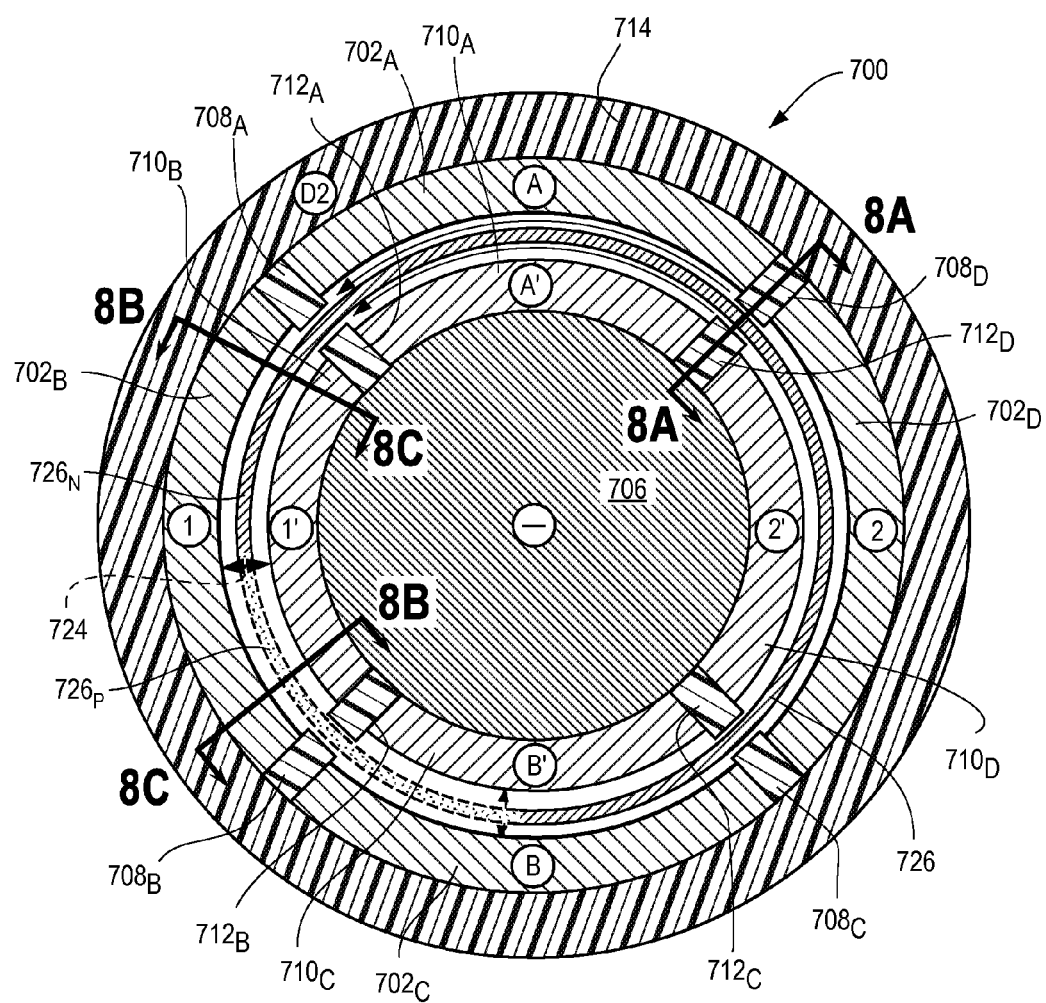
FIG. 7A is a cross-sectional view of an alternating current galvanic cell comprising four cathode current collectors used to power a two-phase electric motor.
Figure 7B:
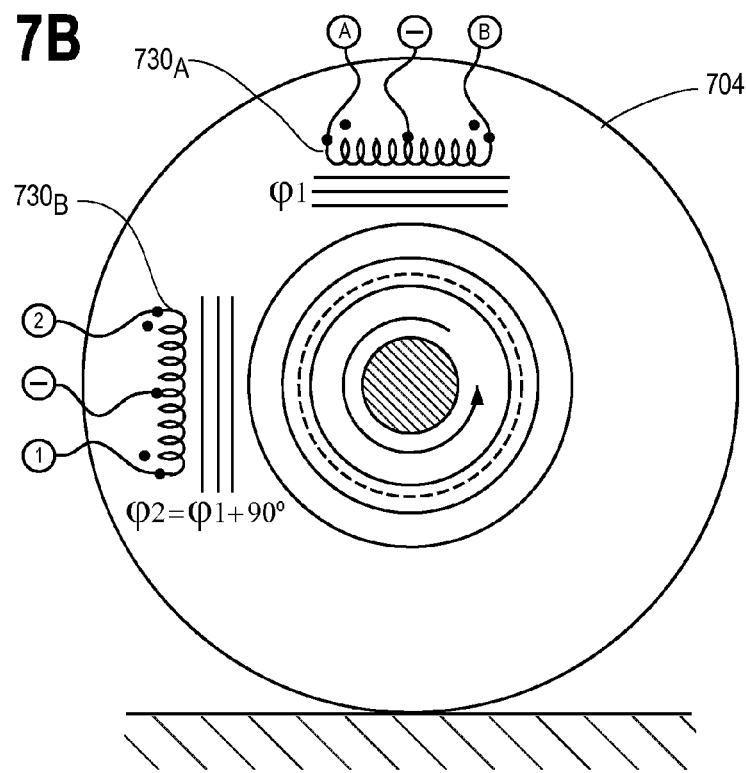
FIG. 7B is a schematic view of the two-phase electric motor powered by the galvanic cell of FIG. 7A.

FIG. 7A is a cross-sectional view of an alternating current galvanic cell 700 comprising four outer current collectors $702_{A,B,C,D}$ used to power a two-phase electric motor 704 of FIG. 7B. An early example of such a motor 704 powered by a two-phase electromechanical generator is illustrated in FIG. 9 of U.S. Pat. No. 381,969 of 1 May 1888 to Nikola Tesla. Here, the galvanic cell 700 may be operated as either a battery or as a fuel cell or a flow cell—depending on a choice of thixotropic or non-conducting electrolytes, the current collectors $702_X$ and external BOP, if any.

The four current outer current collectors $702_X$ are placed in quadrature around cell hub 706; that is, the center of each displaced by 90° in azimuth angle from its adjacent neighbor. Each of the outer current collectors $702_X$ is separated from its neighbors by outer insulators $708_X$. the outer current collectors $702_X$ and the outer insulators $708_X$ form a right, circular cylinder, as shown in FIG. 7A. Each of the four outer current collectors $702_X$ has an electrical connector that is labeled 'A', '1', 'B', and '2', respectively, for connection to an electrical circuit (to be described).

Located within the right, circular cylinder formed by the outer current collectors $702_X$ and the outer insulators $708_X$ is a second right, circular cylinder formed by inner current collectors $710_{A,B,C,D}$ and inner insulators $712_{A,B,C,D}$. The inner current collectors $710_X$ are electrically connected to the cell hub 706 that is an electrical conductor. The cell hub 706 has an electrical connector labeled '−' for connection to the electrical circuit. Each of the four inner current collectors $710_X$ has an electrical connector that is labeled 'A'', '1'', 'B'', and '2'', respectively, for connection to an electrical circuit to be described in another embodiment.

The outer current collectors $702_X$, the outer insulators $708_X$, the inner current collectors $710_X$ and the inner insulators $712_X$ are all static; that is, they do not move. The outer current collectors $702_X$ and the outer insulators $708_X$ are fixed to case 714, which is made of an electrically-insulating material and may contain input and output ports (not shown) that are similar to ports 308 and 310 of FIG. 3 for a fuel cell configuration. The inner current collectors $710_X$ and the inner insulators $712_X$ are fixed to the hub 706, which in this configuration is made of an electrically-conducting material to maintain all of the inner current collectors $710_X$ at the same potential. In another configuration to be described in conjunction with FIG. 7C, the hub 706 is an insulator and the inner current collectors $710_X$ are at different potentials. The inner current collectors $710_X$ may contain input and output ports (not shown) that are similar to ports 318 and 320 of FIG. 3 for a fuel cell configuration.

In this configuration, the outer insulators $708_X$, and the inner insulators $712_X$ each have a 2° azimuth angle. Each of the outer current collectors $702_X$ and the inner current collectors $710_X$ has an 88° azimuth angle.

Insulators $708_X$, and $712_X$ are shown to be closely approaching or fitted to the rotating filter member 726 in order to insulate electrically the current collectors $702_X$, and $710_X$ when highly conductive thixotropic electrolyte suspensions are employed as catholytes and anolytes. Except for some minor end boundary effects, TVF/CCF flow profiles can be established in each azimuthal section because laminar Taylor vortices do not require a circumferential flow component. The insulators $708_X$ and $712_X$ are not required when the electrolyte is essentially non-conducting and used with flow-through porous electrodes containing embedded galvanic particles. Also, the insulators $708_X$ and $712_X$ are not required if the electrodes $702_X$ and $710_X$ are electrically isolated using switches in the external circuit.

Located between the two right circular cylinders is a cylindrical gap 724 containing a rotating circular filter cylinder 726 containing a porous section $726_P$ and a non-porous section $726_N$. The circular filter cylinder 726 is journaled for rotation within the gap 724 by a motor (not shown) and is similar to the rotating circular filter cylinder 326, described above except that the porous section $726_P$ subtends an azimuth angle of approximately 88°. The non-porous section $726_N$ has an azimuth angle of approximately 272°. As explained in the descriptions of the previous embodiments, the cylindrical gap 742 contains a thixotropic catholyte between the outer current collectors $702_X$ and the filter cylinder 726 and a thixotropic anolyte between the inner current collectors $710_X$ and the filter cylinder 726. Thixotropic catholytes and anolytes have been described in Case A2. The liquid electrolytes in the catholyte and in the anolyte can pass through the porous section $726_P$; but, not any of the particulates. Nothing can pass through the non-porous section $726_N$.

Three cross-section lines 8A-8A, 8B-8B and 8C-8C are shown in FIG. 7A. Corresponding sections are shown in FIG. 8A, FIG. 8B and FIG. 8C, respectively.

FIG. 8A illustrates outer insulator $708_D$ and inner insulator $712_D$ very closely fitting both sides of the rotating circular filter cylinder 726 that spins between the insulators $708_D$ and $712_D$ in the gap 724. The insulators $708_D$ and $712_D$ prevent electric charges in one pair of current collectors 702, 710 from reaching an adjacent pair of current collectors 702, 710. The insulators $708_D$ and $712_D$ also limit catholyte and anolyte between one pair of current collectors 702, 710 from mixing with catholyte and anolyte between an adjacent pair of current collectors 702, 710.

It is noted that TVF has not been described in the literature as occurring when isolated in azimuthal sections by axially extending barriers, such as the insulators $708_D$ and $712_D$. In fact, TVF remains quite active except for some end boundary effects where vortices contact the insulators $708_D$ and $712_D$. A division into quadrants or even 6 sections will not preclude active TVF.

FIG. 8B illustrates outer current $702_B$ and inner current collector $710_E$ loosely fitting both sides of the rotating circular filter cylinder 726 porous section $726_P$ that spins between the insulators $708_D$ and $712_D$ in the gap 724. There is sufficient room in the gap 724 for TVF 728 and CCF (not shown) to form.

Similarly, FIG. 8C illustrates outer current $702_B$ and inner current collector $710_B$ loosely fitting both sides of the rotating circular filter cylinder 726 non-porous section $726_N$ that spins between the insulators $708_D$ and $712_D$ in the gap 724. There is sufficient room in the gap 724 for TVF 728 and CCF (not shown) to form.

Returning to FIG. 7B, the motor 704 is shown as a two-phase induction motor having orthogonal, center-tapped stator windings $730_{A,B}$. Usually in actual practice, each half of each of the windings $730_X$ would be located 180° on opposing pole pieces; however, that would complicate the drawing. The stator windings $730_A$ are labeled $\phi 1$ and the stator windings $730_B$ are labeled $\phi 2 = \phi 1 + 90°$ because the stator windings $730_X$ are displaced from each other by 90°.

Although the alternating current galvanic cell 700 could be equipped with an external electrical circuit such as circuit 114 of FIG. 2A, that is not necessary for the motor 704 because the windings $730_X$ are inductors that can be configured to act as transformers similar to the transformer 152 of FIG. 2A; except that a secondary winding may not be necessary.

The winding $730_A$ has connectors 'A' and 'B' and the winding $730_B$ has connectors '1' and '2'—all for connection to the four electrical connectors that is labeled 'A', '1', 'B', and '2' of the outer current collectors $702_{A,B,C,D}$, respectively. Since the windings on opposing motor pole pieces are reversed with respected to each other, the pulsed unidirectional currents generated by the alternating current galvanic cell 700 appear to be alternating current to the motor.

Figure 7C:
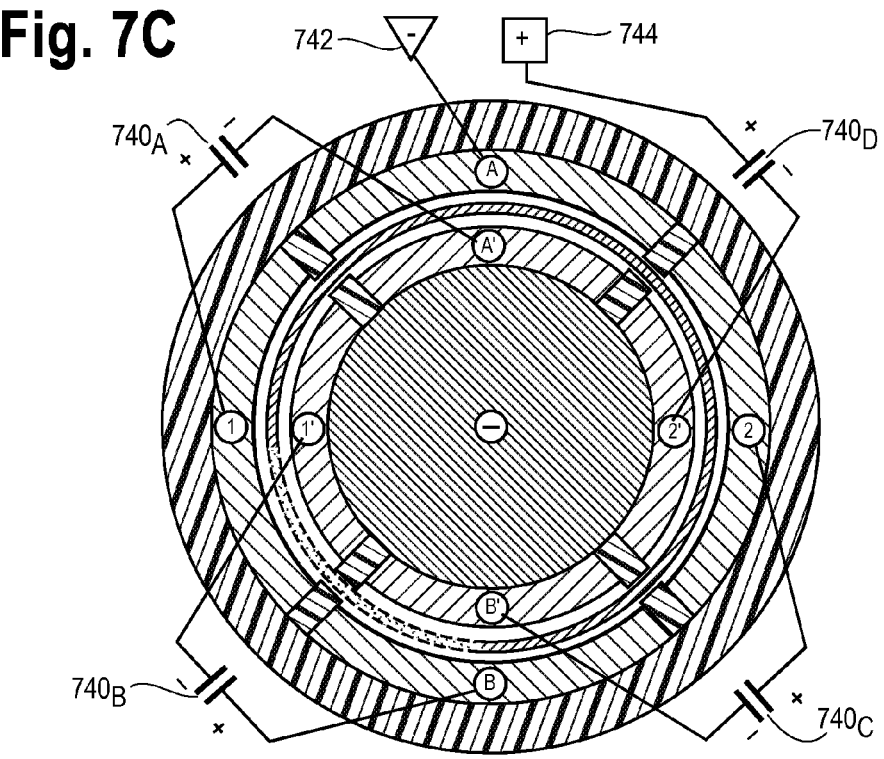
FIG. 7C is a schematic view the galvanic cell of FIG. 7A configured in a voltage-multiplying circuit.

FIG. 7C is a reduced-scale version of the galvanic cell 700 of FIG. 7A in which the reference numerals of FIG. 7A are used to refer counterpart elements in FIG. 7C. Here, the hub 706 is made of an electrically-insulating material and the inner current collectors $710_X$ are at different electrical potentials.

Capacitors $740_X$ are connected between cell negative (−) terminal 742, cell positive (+) terminal 744 and the current collector terminals 'A', '1', 'B', and '2' and 'A'', '1'', 'B'', and '2'' as follows:

| | |
|---|---|
| Negative (−) terminal 742 | A |
| Capacitor $740_A$ | A' - 1 |
| Capacitor $740_B$ | 1' - B |
| Capacitor $740_C$ | B' - 2 |
| Capacitor $740_D$ | 2' - Positive (+) terminal 744 |

Each of the capacitors $740_X$ is sequentially charged as the filter cylinder 726 rotates in the cylindrical gap 724. Thus, the output voltage of the galvanic cell 700 is four-times the voltage appearing across any pair of outer and inner current collectors. The number of times that the voltage can be multiplied is a function of the number of sectors and capacitors incorporated in the galvanic cell 700. So, for example, an 8-fold increase in voltage can be obtained by constructing a galvanic cell with eight sectors and eight capacitors connected in series.

Fourth Embodiment

Three-Phase Fuel Cell

Two-phase alternating current circuits shown in FIGS. 7A and 7B are not as frequent as other polyphase circuits— especially three-phase systems. A three-phase alternating current galvanic cell 900 is shown in FIG. 9A. It is a simplified version of the cell 700 of FIG. 7A and comprises three outer current collectors 902$_{ABC}$ of 118° each in azimuth angle separated from neighbors by three outer insulators 908$_{ABC}$ of 2° each in azimuth angle—all surrounding a cell hub 906 that serves as an inner current collector and has a connector labeled '—'. Journaled within a cylinder formed by the three outer current collectors 902$_X$ and the three outer insulators 908$_X$ is rotating circular filter cylinder having a porous filter section 910$_P$ and a porous filter section 910$_N$.

Each of the three outer current collectors 902$_{ABC}$ has an electrical connector labeled α, β and γ, respectively, that is connected to one end of a primary winding of one of three transformers 912$_{ABC}$ shown in FIG. 9B that are connected in a 'wye' (Y) configuration. The other ends of primary windings of the three transformers 912$_X$ to connected the hub 906 connector labeled '—'. The three transformer 912$_X$ secondary windings are connected in a 'delta' (Δ) configuration to deliver three phases; namely, $\Phi_A$, $\Phi_B$ and $\Phi_C$.

The Electrolyte

The thixotropic electrolytes used in galvanic cells 100, 300, 700 and 900 of this invention are disclosed in Case A2, which is incorporated herein by reference. Alternatively, non-electrically conducting electrolytes containing no galvanic material particles may be used commonly in both the anolyte and the catholyte. In that case, the galvanic particles are embedded within porous current collecting electrodes where the galvanic particles are electrically attached to the porous substrates. Electrolyte (containing fuel or oxidizer in the case of fuel cells as described in Case G) is caused to flow through the porous electrodes as well as within anolyte and catholyte TVF chambers.

The Filter

The porous filter segments 120$_P$, 326$_P$, 726$_P$ and 910$_P$ used in galvanic cells 100, 300, 700 and 900 of this invention are disclosed in Case A2, which is incorporated herein by reference.

In one embodiment, a galvanic electrochemical cell (100, 300, 700, 900) for converting chemical energy into electrical energy comprising an outer cylinder-like current collector (106, 304$_X$, 306$_X$, 710$_X$, 902$_X$) surrounding an inner cylinder-like current collector (108, 314$_X$, 316$_X$, 712$_X$, 906) so as to define a gap (118, 324, 724, 924) between the current collectors (106, 304$_X$, 306$_X$, 710$_X$, 902$_X$; 108, 314$_X$, 316$_X$, 712$_X$, 906), one of the current collectors containing at least two electrically conducting azimuthal segments (106$_X$, 304$_X$, 306$_X$, 702$_X$, 902$_X$) and electrically isolated from each other by an azimuthal insulator segment (106$_C$, 400, 708$_X$, 908$_X$) and another of the current collectors containing at least one electrically conducting azimuthal segment (108, 314$_X$, 316$_X$, 710$_X$, 906)—the electrically conducting azimuthal segments being adapted for connection to an external electrical circuit (114); means (128, 130, 136, 142, BOP) for circulating fluid in the gap (118, 324, 724, 924); a cylinder-like filter (120$_X$, 326, 726, 910) located in the gap (118, 324, 724, 924) having an azimuthal ion-porous particle filter segment (120$_P$, 326$_P$, 726$_P$, 910$_P$) and an azimuthal non-porous segment (120$_N$, 326$_N$, 726$_N$, 910$_N$); and dividing the gap (118, 324, 724, 924) between the outer and inner collectors (106, 304$_X$, 306$_X$, 710$_X$, 902$_X$; 108, 314$_X$, 316$_X$, 712$_X$, 906) into outer and inner electrolyte chambers for flowing a different electrolyte in each of the chambers; and means (126, 128, 130, 526, 528, 530, 626, 628, 630) for providing relative rotation between the filter (120, 414, 520, 620) and one of the current collectors (106, 506, 606, 108, 508, 608) to create flows (144, 146, 148, 150, 336, 338, 728) in fluid located in the gap (118, 324, 724, 924).

In a second embodiment, the galvanic electrochemical cell (100, 300, 700, 900) wherein the flows created in the gap are Taylor Vortex Flows (144, 146, 336, 728).

In a third embodiment, the galvanic electrochemical cell (100, 300, 700, 900) wherein the flows created in the gap are Circular Couette Flows (148, 150, 338).

In a fourth embodiment, the galvanic electrochemical cell (100,300,700,900) wherein at least one of the current collector segments (106$_X$, 304$_X$, 306$_X$, 702$_X$, 902$_X$; 108, 314$_X$, 316$_X$, 710$_X$, 906) that is a solid; and a thixotropic fluid is circulated in the gap (118, 324, 724, 924).

In a fifth embodiment, the galvanic electrochemical cell (100,300,700,900) wherein thixotropic electrolyte in one of the electrolyte chambers is a catholyte and thixotropic electrolyte in the other of the electrolyte chambers is an anolyte In a sixth embodiment, the galvanic electrochemical cell (100,300,700,900) comprises at least one current collector segment (106$_X$, 304$_X$, 306$_X$, 702$_X$, 902$_X$; 108, 314$_X$, 316$_X$, 710$_X$, 906) is porous and contains galvanic material particles of one type within its pores that are select from a group consisting of faradaic materials and catalytic materials; and an electrically non-conductive electrolyte is pumped through the pores of the porous current collector segment (106$_X$, 304$_X$, 306$_X$, 702$_X$, 902$_X$; 108, 314$_X$, 316$_X$, 710$_X$, 906).

In a seventh embodiment, the galvanic electrochemical cell (100,300,700,900) wherein the current collector segments (106$_X$, 304$_X$, 306$_X$, 702$_X$, 902$_X$; 108, 314$_X$, 316$_X$, 710$_X$, 906) are connected to the electrical circuit (114), which contains an energy storage element selected from an electrically-reactive component group consisting of an inductor (152, 374, 730$_X$, 912$_X$) and a capacitor (156, 382$_X$).

In an eighth embodiment, the galvanic electrochemical cell (100,300,700,900) wherein the electrical circuit (14) comprises windings (730$_X$) of an electrical motor (704).

In a ninth embodiment, the galvanic electrochemical cell (100,300,700,900) wherein the electrical circuit (14) comprises a wye-delta circuit (912$_X$).

In a tenth embodiment, the galvanic electrochemical cell (100,300,700,900) of Claim 1 wherein one of the outer current collector segments (106$_X$, 304$_X$, 306$_X$, 702$_X$, 902$_X$); is connected to one of the inner current collector segments (108, 314$_X$, 316$_X$, 710$_X$, 906) by a capacitor (740$_X$).

In an eleventh embodiment, the galvanic electrochemical cell (100,300,700,900) of Claim 1 containing a plurality of individual cells (302$_X$) wherein one of the outer current collector segments (106$_X$, 304$_X$, 306$_X$, 702$_X$, 902$_X$) of one individual cell is connected to one of the inner current collector segments (108, 314$_X$, 316$_X$, 710$_X$, 906) of another individual cell by a conductor (352, 354, 356, 362, 364, 366).

In an twelfth embodiment, the galvanic electrochemical cell (100,300,700,900) wherein one of the current collector segments (106$_X$, 304$_X$, 306$_X$, 702$_X$, 902$_X$; 108, 314$_X$, 316$_X$, 710$_X$, 906) is connected to an external electrical circuit (114) to a load (380) through a component selected from an electrically-reactive component group consisting of an inductor (152, 374, 730$_X$, 912$_X$) and a capacitor (156, 382$_X$).

In a thirteenth embodiment, the galvanic electrochemical cell (100,300,700,900) wherein one of the current collector segments (106$_X$, 304$_X$, 306$_X$, 702$_X$, 902$_X$; 108, 314$_X$, 316$_X$, 710$_X$, 906) is connected through an external electrical circuit (114) to a load (380) through a transistor (370$_X$).

(13) In a fourteenth embodiment, the galvanic electrochemical cell (100, 300, 700, 900) wherein the transistor ($370_X$) is connected to a sensor ($376_X$) that detects when the transistor ($376_X$) must switch to state selected from a group consisting of full conduction and zero conduction.

In a fifteenth embodiment the galvanic electrochemical cell (100,300,700,900) wherein the sensor ($376_X$) detects segments (502, 504) on a sector wheel (500) that rotates with the cylinder-like filter ($120_X$, 326, 726, 910).

In a sixteenth embodiment, the galvanic electrochemical cell (100,300,700,900) wherein the height (h') varies as a function of azimuth angle.

CONCLUSION

The galvanic electrochemical cells 100, 300, 700 and 900 of this invention offer alternating current electrochemical energy conversion systems far exceeding performances of prior art devices—including the long-standing 1-Ampere/cm² fuel cell electrode performance barrier of the prior art.

All patents and patent applications identified in this disclosure are hereby incorporated herein by reference.

While the present disclosure has been presented above with respect to the described and illustrated embodiments using TVF and CCF, it is to be understood that the disclosure is not to be limited to those alternatives and described embodiments. Accordingly, reference should be made primarily to the following claims to determine the scope of my invention.

We claim:

1. A galvanic electrochemical cell (100, 300, 700, 900) for converting chemical energy into electrical energy comprising:
   a. an outer cylinder-like current collector (106, $304_X$, $306_X$, $710_X$, $902_X$) surrounding an inner cylinder-like current collector (108, $314_X$, $316_X$, $712_X$, 906) so as to define a gap (118, 324, 724, 924) between the current collectors (106, $304_X$, $306_X$, $710_X$, $902_X$; 108, $314_X$, $316_X$, $712_X$, 906), one of the current collectors containing at least two electrically conducting azimuthal segments ($106_X$, $304_X$, $306_X$, $702_X$, $902_X$) that are electrically isolated from each other by an azimuthal insulator segment ($106_C$, 400, $708_X$, $908_X$) and the other of the current collectors containing at least one electrically conducting azimuthal segment (108, $314_X$, $316_X$, $710_X$, 906)—the electrically conducting azimuthal segments being adapted for connection to an external electrical circuit (114);
   b. means (128, 130, 136, 142, BOP) for circulating fluid in the gap (118, 324, 724, 924);
   c. a cylinder-like filter ($120_X$, 326, 726, 910) located in the gap (118, 324, 724, 924) having
      1. an azimuthal ion-porous particle filter segment ($120_P$, $326_P$, $726_P$, $910_P$) and
      2. an azimuthal non-porous segment ($120_N$, $326_N$, $726_N$, $910_N$); and
      and dividing the gap (118, 324, 724, 924) between the outer and inner collectors (106, $304_X$, $306_X$, $710_X$, $902_X$; 108, $314_X$, $316_X$, $712_X$, 906) into outer and inner electrolyte chambers; and
   d. means (126, 128, 130, 526, 528, 530, 626, 628, 630) for providing relative rotation between the filter (120, 414, 520, 620) and one of the current collectors (106, 506, 606, 108, 508, 608) to create flows (144, 146, 148, 150, 336, 338, 728) in fluid located in the gap (118, 324, 724, 924).

2. The galvanic electrochemical cell (100, 300, 700, 900) of claim 1 wherein the flows created in the gap are:
   Taylor Vortex Flows (144, 146, 336, 728).

3. The galvanic electrochemical cell (100, 300, 700, 900) of claim 1 wherein the flows created in the gap are:
   Circular Couette Flows (148, 150, 338).

4. The galvanic electrochemical cell (100,300,700,900) of claim 1 wherein:
   a. at least one of the current collector segments ($106_X$, $304_X$, $306_X$, $702_X$, $902_X$; 108, $314_X$, $316_X$, $710_X$, 906) is a solid; and
   b. a thixotropic fluid is circulated in the gap (118, 324, 724, 924).

5. The galvanic electrochemical cell (100,300,700,900) of claim 4 wherein:
   the thixotropic electrolyte in one of the electrolyte chambers is a catholyte and the thixotropic electrolyte in the other of the electrolyte chambers is an anolyte.

6. The galvanic electrochemical cell (100,300,700,900) of claim 1 wherein:
   a. at least one current collector segment ($106_X$, $304_X$, $306_X$, $702_X$, $902_X$; 108, $314_X$, $316_X$, $710_X$, 906) is porous and contains galvanic material particles of one type within its pores that are select from a group consisting of faradaic materials and catalytic materials; and
   b. An electrically non-conductive electrolyte is pumped through the pores of the porous current collector segment ($106_X$, $304_X$, $306_X$, $702_X$, $902_X$; 108, $314_X$, $316_X$, $710_X$, 906).

7. The galvanic electrochemical cell (100,300,700,900) of claim 1 wherein the current collector segments ($106_X$, $304_X$, $306_X$, $702_X$, $902_X$; 108, $314_X$, $316_X$, $710_X$, 906) are:
   connected to the electrical circuit (114), which contains an energy storage element selected from an electrically-reactive component group consisting of an inductor (152, 374, $730_X$, $912_X$) and a capacitor (156, $382_X$).

8. The galvanic electrochemical cell (100,300,700,900) of claim 7 wherein the electrical circuit (14) comprises:
   windings ($730_X$) of an electrical motor (704).

9. The galvanic electrochemical cell (100,300,700,900) of claim 7 wherein the electrical circuit (14) comprises:
   a wye-delta circuit ($912_X$).

10. The galvanic electrochemical cell (100,300,700,900) of claim 1 wherein one of the outer current collector segments ($106_X$, $304_X$, $306_X$, $702_X$, $902_X$); is connected to one of the inner current collector segments (108, $314_X$, $316_X$, $710_X$, 906) by:
    a capacitor ($740_X$).

11. The galvanic electrochemical cell (100,300,700,900) of claim 1 containing a plurality of individual cells ($302_X$) wherein one of the outer current collector segments ($106_X$, $304_X$, $306_X$, $702_X$, $902_X$) of one individual cell is connected to one of the inner current collector segments (108, $314_X$, $316_X$, $710_X$, 906) of another individual cell by:
    a conductor (352, 354, 356, 362, 364, 366).

12. The galvanic electrochemical cell (100,300,700,900) of claim 1 wherein one of the current collector segments ($106_X$, $304_X$, $306_X$, $702_X$, $902_X$; 108, $314_X$, $316_X$, $710_X$, 906) is connected to an external electrical circuit (114) to a load (380) through a:
    component selected from an electrically-reactive component group consisting of an inductor (152, 374, $730_X$, $912_X$) and a capacitor (156, $382_X$).

13. The galvanic electrochemical cell (100,300,700,900) of claim 1 wherein one of the current collector segments ($106_X$, $304_X$, $306_X$, $702_X$, $902_X$; 108, $314_X$, $316_X$, $710_X$, 906) is connected through an external electrical circuit (114) to a load (380) through a:
    transistor ($370_X$).

14. The galvanic electrochemical cell (100,300,700,900) of claim 13 wherein the transistor (370$_X$) is connected to a sensor (376$_X$) that detects when the transistor (376$_X$) must switch to state selected from a group consisting of full conduction and zero conduction.

15. The galvanic electrochemical cell (100,300,700,900) of claim 14 wherein the sensor (376$_X$) detects segments (502, 504) on a sector wheel (500) that rotates with the cylinder-like filter (120$_X$, 326, 726, 910).

16. The galvanic electrochemical cell (100, 300,700, 900) of claim 1 wherein the height (h') of a conducting portion of at least one of the current collectors (106, 108, 304$_X$, 306$_X$, 314x, 316x, 710$_X$, 712x, 902$_X$, 906) varies as a function of azimuth angle.

\* \* \* \* \*